(12) United States Patent
Lee

(10) Patent No.: US 11,550,357 B2
(45) Date of Patent: Jan. 10, 2023

(54) ELECTRONIC DEVICE

(71) Applicant: Samsung Display Co., Ltd., Yongin-Si (KR)

(72) Inventor: Jiheon Lee, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/229,072

(22) Filed: Apr. 13, 2021

(65) Prior Publication Data

US 2022/0011816 A1 Jan. 13, 2022

(30) Foreign Application Priority Data

Jul. 8, 2020 (KR) .................. 10-2020-0083919

(51) Int. Cl.
*G06F 1/16* (2006.01)
*G09F 9/30* (2006.01)

(52) U.S. Cl.
CPC ............ *G06F 1/1616* (2013.01); *G09F 9/301* (2013.01)

(58) Field of Classification Search
CPC combination set(s) only.
See application file for complete search history.

(56) References Cited

U.S. PATENT DOCUMENTS

| | | | |
|---|---|---|---|
| 9,572,272 B2 * | 2/2017 | Lee | ............... H05K 5/0021 |
| 9,603,271 B2 * | 3/2017 | Lee | ............... G06F 1/1652 |
| 10,433,438 B2 | 10/2019 | Moon et al. | |
| 10,503,211 B2 * | 12/2019 | Yee | ............... G06F 1/1641 |
| 10,645,205 B2 * | 5/2020 | Lee | ............... H04M 1/0237 |
| 10,694,624 B2 * | 6/2020 | Rothkopf | ............ H04M 1/0268 |
| 11,181,763 B2 * | 11/2021 | Kim | ............ G06F 1/1652 |
| 11,256,304 B2 * | 2/2022 | Mehandjiysky | ...... G06F 1/1681 |
| 11,304,316 B2 * | 4/2022 | Rothkopf | ............ H04M 1/0216 |
| 2015/0257289 A1 * | 9/2015 | Lee | ............... G06F 1/1641 |
| | | | 361/749 |
| 2017/0357289 A1 * | 12/2017 | Ahn | ............... G09F 9/301 |
| 2020/0037716 A1 | 2/2020 | Lim | |
| 2020/0375046 A1 * | 11/2020 | Sim | ............... H05K 5/0017 |

(Continued)

FOREIGN PATENT DOCUMENTS

| | | | |
|---|---|---|---|
| KR | 101748692 B1 | 6/2017 | |
| KR | 101784880 B1 | 10/2017 | |

(Continued)

*Primary Examiner* — Lisa Lea-Edmonds
(74) *Attorney, Agent, or Firm* — Cantor Colburn LLP

(57) ABSTRACT

An electronic device includes a display module including: a display panel foldable with respect to a folding axis and a support part disposed under the display panel; and an accommodating part which accommodates the display module. The display panel includes: a first display portion covered by the accommodating part in a folded state of the display panel; and a second display portion exposed to the outside in the folded state. The accommodating part includes: a first accommodating part which accommodates the first display portion in the folded state; and a second accommodating part which accommodates the first accommodating part in the folded state. As the display panel is folded, an included angle between the first display portion and the second display portion decreases, and an area in which the first accommodating part overlaps the second accommodating part increases in a plan view.

19 Claims, 21 Drawing Sheets

(56) References Cited

U.S. PATENT DOCUMENTS

| | | | |
|---|---|---|---|
| 2020/0393931 A1* | 12/2020 | Lee | G09G 3/3275 |
| 2021/0018962 A1* | 1/2021 | de la Fuente | G06F 1/1624 |
| 2021/0181807 A1* | 6/2021 | Mehandjiysky | G06F 1/1652 |
| 2021/0298186 A1* | 9/2021 | Yoo | H05K 1/189 |
| 2021/0365074 A1* | 11/2021 | Mehandjiysky | G06F 1/1652 |

FOREIGN PATENT DOCUMENTS

| | | |
|---|---|---|
| KR | 1020180087826 A | 8/2018 |
| KR | 1020190143029 A | 12/2019 |
| KR | 1020200018282 A | 2/2020 |

\* cited by examiner

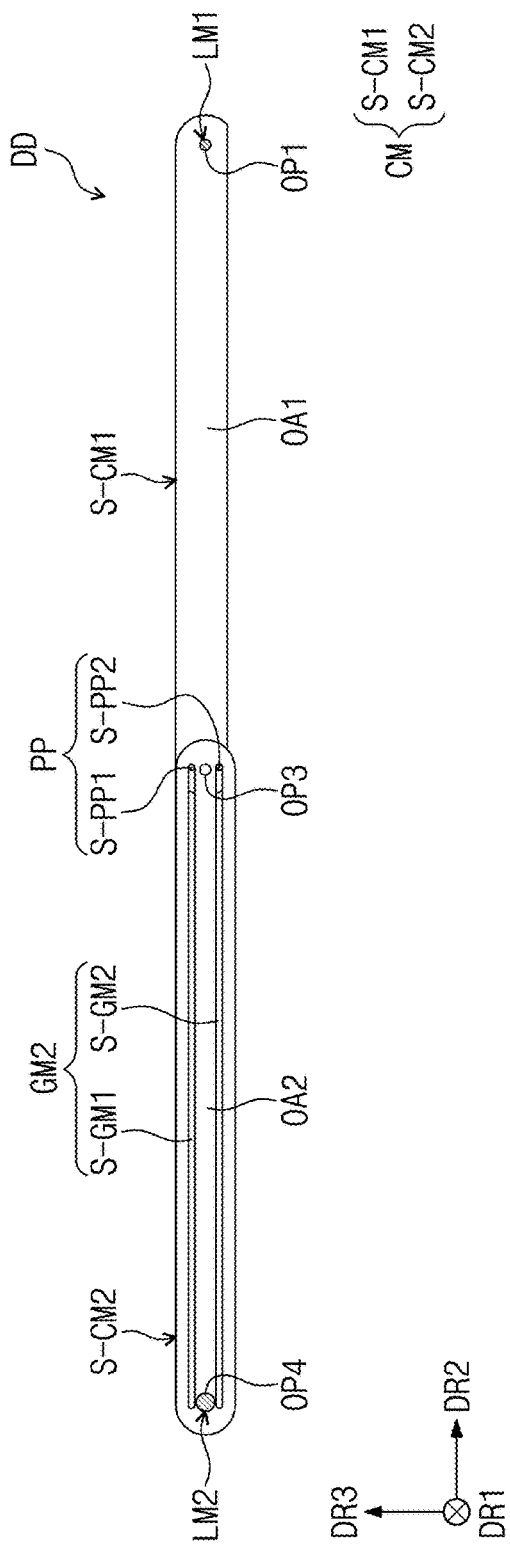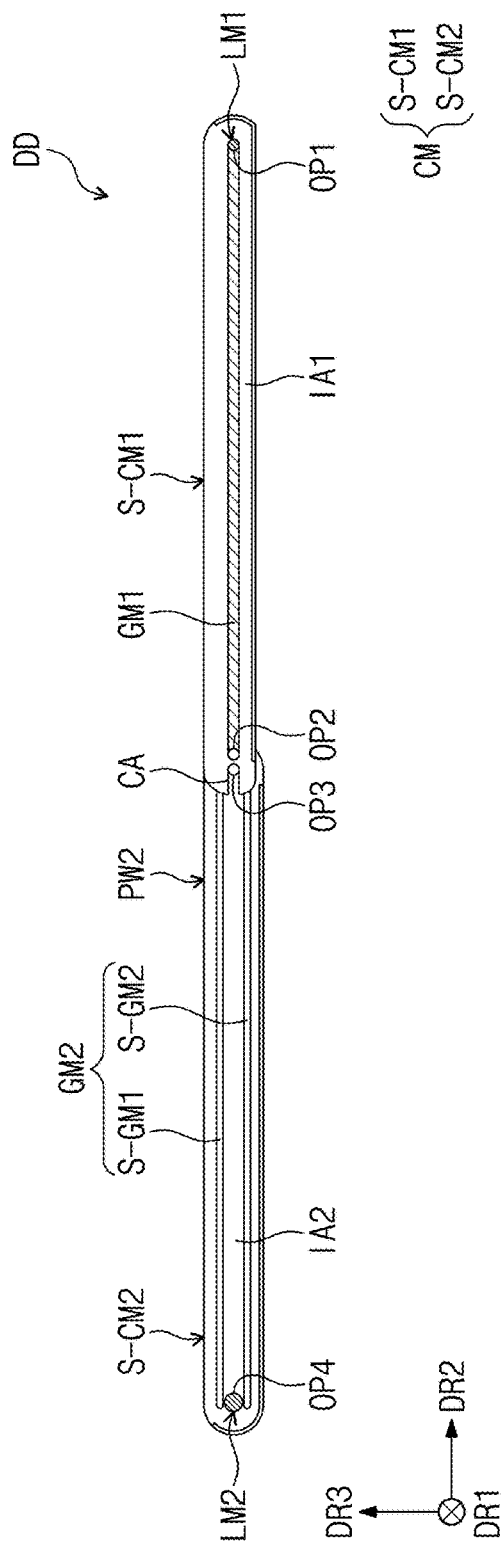

ELECTRONIC DEVICE

This application claims priority to Korean Patent Application No. 10-2020-0083919, filed on Jul. 8, 2020, and all the benefits accruing therefrom under 35 U.S.C. § 119, the content of which in its entirety is herein incorporated by reference.

BACKGROUND

1. Field of Disclosure

The present disclosure relates to an electronic device. More particularly, the present disclosure relates to an electronic device including an accommodating part that protects a display surface of the electronic device when the electronic device is in a folded state.

2. Description of the Related Art

An electronic device displays various images through a display screen to provide a user with information. In general, the electronic device displays the information in an allocated screen area. A flexible electronic device including a flexible display panel that is foldable is being developed. Different from a rigid electronic device, the flexible electronic device is foldable, rollable, or bendable. The flexible electronic device, which is capable of being changed into various shapes, is easy to carry and improves a user's convenience.

Meanwhile, the flexible electronic device is vulnerable to external impacts due to the nature of the material, and in the case of the foldable electronic device whose entire display surface is exposed to the outside, the display surface is easily damaged. Therefore, researches for a structure that is capable of protecting the foldable electronic device whose entire display surface is exposed to the outside, are underway.

SUMMARY

The present disclosure provides an electronic device including an accommodating part that covers a portion of a display surface of the electronic device when the electronic device is in a folded state to protect the electronic device.

Embodiments of the inventive concept provide an electronic device including: a display module including a display panel foldable with respect to a folding axis extending in a first direction and a support part disposed under the display panel; and an accommodating part which accommodates the display module. The display panel includes a first display portion covered by the accommodating part in a folded state of the display panel and a second display portion exposed to the outside in the folded state of the display panel. The accommodating part includes a first accommodating part which accommodates the first display portion in the folded state and a second accommodating part which accommodates the first accommodating part in the folded state. As the display panel is folded, an included angle between the first display portion and the second display portion decreases, and an area in which the first accommodating part overlaps the second accommodating part increases in a plan view.

The support part may include: a first support part; a second support part spaced apart from the first support part in a second direction substantially perpendicular to the first direction; a center rotating part disposed between the first support part and the second support part and corresponding to the folding axis; and two edge rotating parts spaced apart from each other in the first direction with the center rotating part interposed therebetween.

The accommodating part may include: a first accommodating part disposed under the first support part; a second accommodating part disposed under the second support part; a first engaging part which couples the first accommodating part and the two edge rotating parts; and a second engaging part which couples the second accommodating part and the two edge rotating parts. The first accommodating part may include a first bottom surface and first barriers substantially perpendicular to the first bottom surface, the second accommodating part may include a second bottom surface and second barriers substantially perpendicular to the second bottom surface, each of the first barriers may define first and second holes penetrating a first inner side surface and a first outer side surface of the first barrier, a first guide part between the first hole and the second hole and concave to the first outer side surface from the first inner side surface, and a concave portion recessed toward the second hole from one end of the each of the first barriers adjacent to the second accommodating part, and may include a protrusion part protruded from the first outer side surface adjacent to the second accommodating part, each of the second barriers may define third and fourth holes penetrating a second inner side surface and a second outer side surface of the second barrier, and a second guide part between the third hole and the fourth hole, the second engaging part may be inserted into the fourth hole, and the protrusion part may be inserted into the second guide part.

The first and second display portions may overlap the first and second accommodating parts, respectively, in a first state in which the first and second display portions are disposed on the same plane, and the first display portion, the second display portion, the first accommodating part, and the second accommodating part may overlap each other in the plan view in a second state in which the display panel is completely folded.

The first engaging part may be inserted into the first hole in the first state, and the first engaging part may be inserted into the second hole in the second state.

The protrusion part may be inserted into a first side of the second guide part, which is adjacent to the third hole, in the first state, and the protrusion part may be inserted into a second side of the second guide part, which is adjacent to the fourth hole, in the second state.

The included angle between the first display portion and the second display portion in the first state may be about 180 degrees (°), the included angle between the first display portion and the second display portion in the second state is about zero (0) degrees (°), and the included angle between the first display portion and the second display portion gradually decreases as the first state is changed from the first state to the second state.

The first engaging part may be inserted into the first guide part, and the first display portion and the second display portion may be disposed to be inclined with respect to the accommodating part and have a first included angle between the first display portion and the second display portion in a third state that is an intermediate state between the first state and the second state.

The first included angle may be greater than about 70 degrees (°) and smaller than about 180 degrees (°).

A position of the concave portion may correspond to the third hole, and the first display portion and the second display portion may be disposed to be inclined with respect to the accommodating part and have a second included angle between the first display portion and the second display portion and smaller than the first included angle in a fourth state that is an intermediate state between the third state and the second state.

The second included angle may be equal to or greater than about 50 degrees (°) and equal to or smaller than about 70 degrees (°).

The position of the concave portion may be spaced apart from the third hole in the second direction, and the first display portion and the second display portion may be disposed to be inclined with respect to the accommodating part and have a third included angle between the first display portion and the second display portion and smaller than the second included angle in a fifth state that is an intermediate state between the fourth state and the second state.

The third included angle may be equal to or greater than about 0 degrees (°) and smaller than about 50 degrees (°).

A position of the protrusion part inserted into the second guide part may move to the fourth hole from the third hole while the fifth state is changed to the second state.

The protrusion part may include a first protrusion part and a second protrusion part spaced apart from the first protrusion part in a thickness direction with the second hole interposed therebetween.

The second guide part may define a first sub-guide part and a second sub-guide part spaced apart from the first sub-guide part in the thickness direction with the third and fourth holes interposed therebetween.

The first sub-guide part may be coupled to the first protrusion part, and the second sub-guide part is coupled to the second protrusion part.

The first accommodating part may include a first surface extending in the first direction and having a first length in the first direction shorter than a second length of a second surface of the second accommodating part extending in the first direction.

The first accommodating part may be disposed between the second accommodating part and the display module in the second state.

According to the above, as the electronic device includes the accommodating part that is slidable, a portion of the display surface may be covered by the accommodating part in the folded state, and the portion of the display panel may be protected from the external impacts.

BRIEF DESCRIPTION OF THE DRAWINGS

The above and other advantages of the present disclosure will become readily apparent by reference to the following detailed description when considered in conjunction with the accompanying drawings wherein:

FIG. 5B is a side view showing an outer side surface of the electronic device of FIG. 5A;

FIG. 5C is a side view showing an inner side surface of the electronic device of FIG. 5A;

DETAILED DESCRIPTION

Figure 1A:
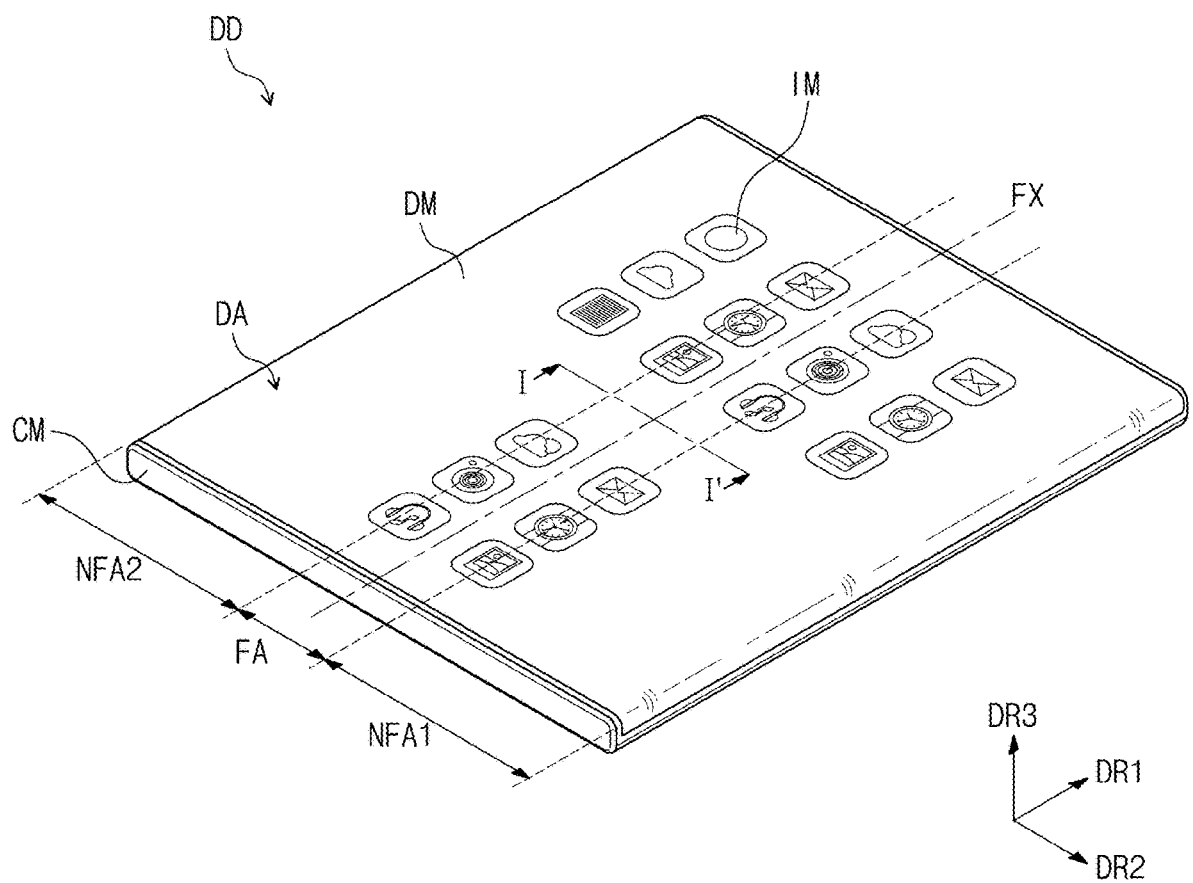
FIG. 1A is a perspective view showing an electronic device according to an embodiment of the present disclosure.

The present disclosure may be variously modified and realized in many different forms, and thus specific embodiments will be exemplified in the drawings and described in detail hereinbelow. However, the present disclosure should not be limited to the specific disclosed forms, and be construed to include all modifications, equivalents, or replacements included in the spirit acid scope of the present disclosure.

In the present disclosure, it will be understood that when an element or layer is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content.

As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as shown in the figures.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, the present disclosure will be explained in detail with reference to the accompanying drawings.

Figure 1B:
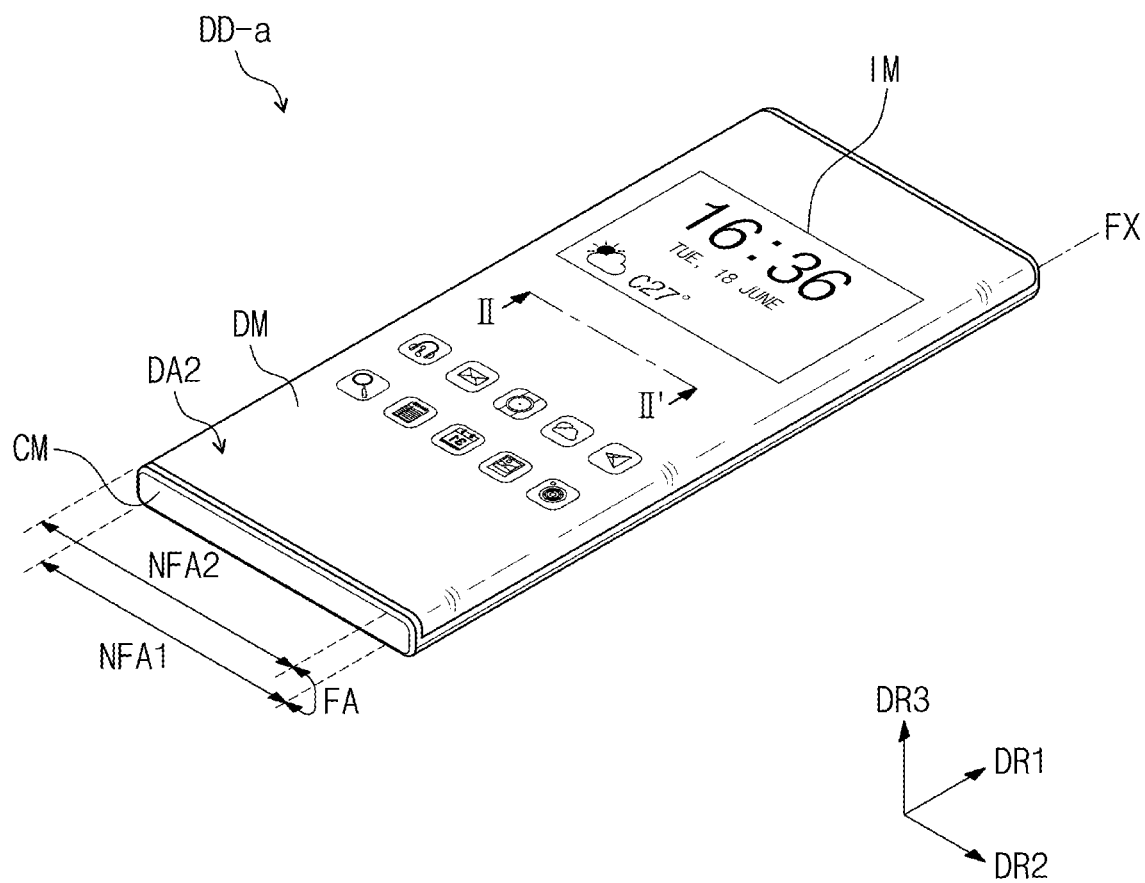
FIG. 1B is a perspective view showing an electronic device in a folded state according to an embodiment of the present disclosure.

FIG. 1A is a perspective view showing an electronic device DD in an unfolded state according to an embodiment of the present disclosure. FIG. 1B is a perspective view showing an electronic device DD-a in a folded state according to an embodiment of the present disclosure.

Referring to FIG. 1A, the electronic device DD may be activated in response to electrical signals applied thereto. The electronic device DD may be a mobile phone, a tablet computer, a car navigation unit, a game unit, or a wearable unit, however, it should not be limited thereto or thereby. FIG. 1A shows a mobile phone as a representative example of the electronic device DD.

The electronic device DD may be a foldable electronic device. The electronic device DD may include a display module DM and an accommodating part CM protecting the display module DM. The electronic device DD may display an image IM through an active area DA. When the electronic device DD is in an unfolded state, the active area DA may include a plane substantially parallel to a plane defined by a first direction DR1 and a second direction DR2.

The display module DM may include a folding area FA foldable with respect to a folding axis FX extending in the first direction DR1, a first non-folding area NFA1 defined adjacent to one side of the folding area FA, and a second non-folding area NFA2 defined adjacent to the other side of the folding area FA, and the folding area FA may be disposed between the first non-folding area NFA1 and the second non-folding area NFA2. That is, the first non-folding area NFA1, the folding area FA, and the second non-folding area NFA2 may be sequentially arranged in the second direction DR2. The second direction DR2 is substantially perpendicular to the first direction DR1. As used herein, "substantially perpendicular" includes a case of "perpendicular."

FIG. 1A show one folding area FA and first and second non-folding areas NFA1 and NFA2, however, the number of the folding areas and the number of the non-folding areas according to the invention should not be limited thereto or thereby. In another embodiment, for example, the display module DM may include three or more non-folding areas and folding areas disposed between the non-folding areas.

A thickness direction of the electronic device DD may be substantially parallel to a third direction DR3 crossing the first and second directions DR1 and DR2. Here, front (in other words, "upper") and rear (in other words, "lower") surfaces of each member of the electronic device DD may be defined with respect to the third direction DR3.

Referring to FIG. 1B, the electronic device DD (refer FIG. 1A) may be changed to an electronic device DD-a that is in a folded state of the electronic device DD (refer FIG. 1A). When the display module DM of the electronic device DD is folded, a display surface of the first non-folding area NFA1 and a display surface of the second non-folding area NFA2 may face in opposite directions. That is, a rear surface of the display module DM corresponding to the first non-folding area NFA1 and a rear surface of the display module DM corresponding to the second non-folding area NFA2 may face each other. The display surface of the first non-folding area NFA1 and the display surface of the second non-folding area NFA2 may be referred to as a first display portion DA1 (refer to FIG. 2) and a second display portion DA2 (refer to FIG. 2), respectively. In the folded state, the first display portion DA1 may be covered by the accommodating part CM, and the second display portion DA2 may be exposed to the outside. This folded state may be called an out-folding state. The first display portion DA1 and the second display portion DA2 may be disposed on the same plane during the non-folded state and may overlap each other in the thickness direction (i.e., third direction DR3) during the folded state.

The accommodating part CM may cover the entire rear surface of the display module DM in the non-folded state and may cover the first display portion DA1 of the display module DM in the folded state.

Figure 2:
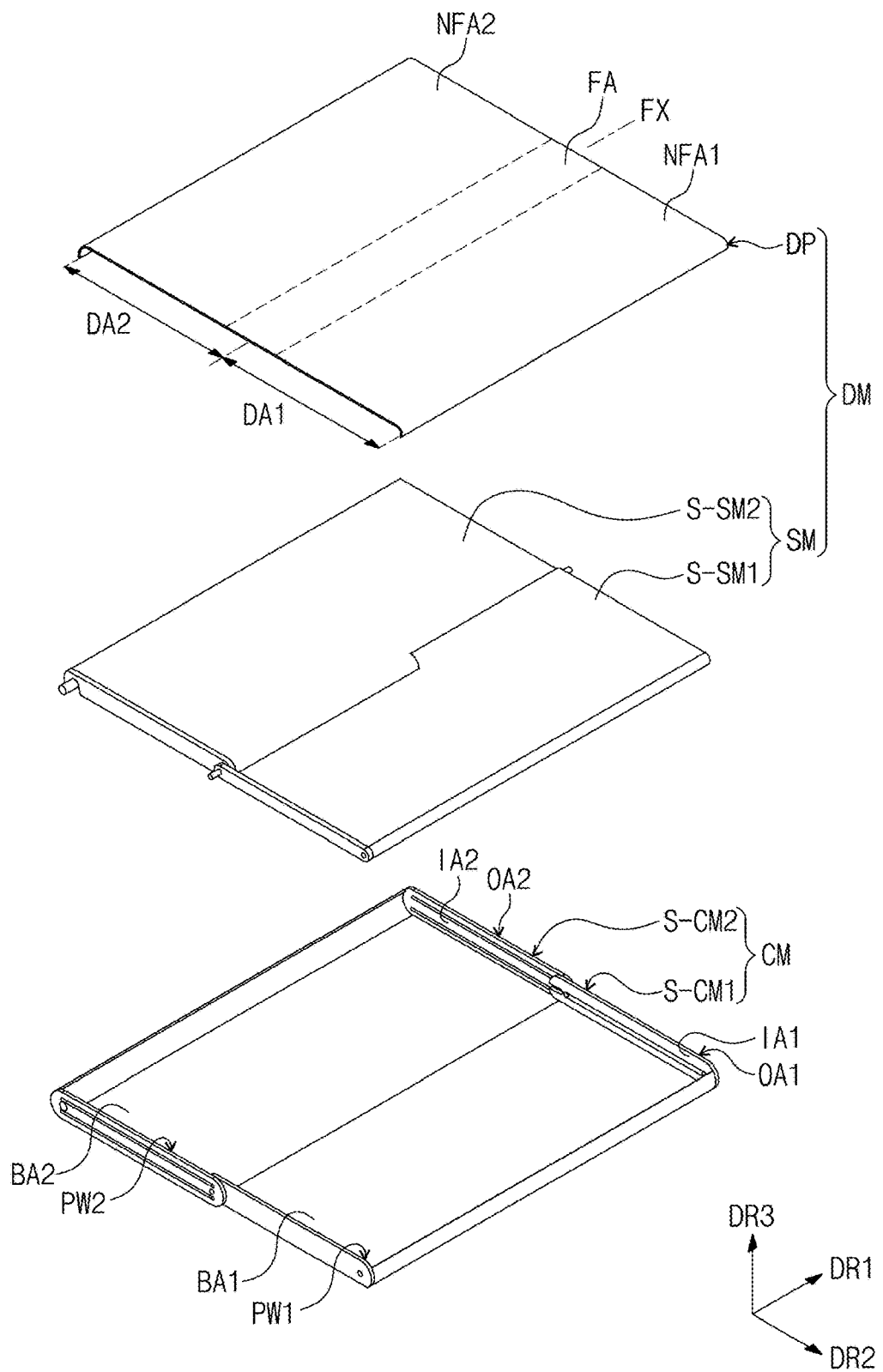
FIG. 2 is an exploded perspective view showing an electronic device according to an embodiment of the present disclosure.

FIG. 2 is an exploded perspective view showing an electronic device according to an embodiment of the present disclosure.

Referring to FIG. 2, the electronic device DD may include the display module DM and the accommodating part CM. The display module DM includes a display panel DP and a support part SM.

The display panel DP may display the image IM (refer to FIG. 1A) and may sense an external input. The external input may be a user's input. The electronic device DD may sense the external input applied to a side surface or a rear surface of the electronic device DD according to a structure of the electronic device DD.

Although not shown in figures, the display panel DP may include an input sensing layer (not shown) obtaining coordinate information of the external input. The display panel DP may be a light-emitting type display panel, however, it should not be particularly limited. For instance, the display panel DP may be an organic light emitting display panel or a quantum dot light emitting display panel. A light emitting layer of the organic light emitting display panel may include an organic light emitting material. A light emitting layer of the quantum dot light emitting display panel may include a quantum dot or a quantum rod.

Although not shown in figures, the input sensing layer (not shown) may be disposed directly on the display panel DP. For example, the input sensing layer may be directly formed on the display panel DP through successive manufacturing processes. The input sensing layer may include a plurality of insulating layers and a plurality of conductive layers. The conductive layers may include a sensing electrode that senses the external input, a sensing line connected to the sensing electrode, and a sensing pad connected to the sensing line. The input sensing layer may sense the external input in a mutual capacitance method and/or a self-capacitance method, however, the method of sensing the external input according to the invention should not be limited thereto or thereby.

The display panel DP may include the first non-folding area NFA1, the folding area FA, and the second non-folding area NFA2, which are defined therein and sequentially arranged in the second direction DR2. That is, the display panel DP may include the folding area FA foldable around the folding axis FX extending in the first direction DR1, the first non-folding area NFA1 disposed at one side of the folding area FA, and the second non-folding area NFA2 disposed at the other side of the folding area FA. The folding area FA may be disposed between the first non-folding area NFA1 and the second non-folding area NFA2.

The first display portion DA1 including the first non-folding area NFA1 and a portion of the folding area FA and the second display portion DA2 including the second non-folding area NFA2 and the other portion of the folding area FA may be defined in the display panel DP with respect to the folding axis FX. The folding axis FX, the first non-folding area NFA1, the second non-folding area NFA2, the folding area FA, the first display portion DA1, and the second display portion DA2 defined in the display panel DP may correspond to the folding axis FX, the first non-folding area NFA1, the second non-folding area NFA2, the folding area FA, the first display portion DA1, and the second display portion DA2 of the display module DM shown in FIG. 1A, respectively.

When the display panel DP is in the unfolded state, all the folding area FA, the first non-folding area NFA1, and the second non-folding area NFA2 may serve as the display surface and may be exposed to the outside, and when the display panel DP is in the folded state, the second non-folding area NFA2 and a portion of the folding area FA may serve as the display surface and may be exposed to the outside.

The support part SM may be disposed under the display panel DP. The support part SM may support a rear surface of the display panel DP. The support part SM may include a first support part S-SM1 that overlaps the first non-folding area NFA1 and a portion of the folding area FA and a second support part S-SM2 that overlaps the second non-folding area NFA2 and the other portion of the folding area FA in a plan view (i.e., view in the third direction DR3).

The accommodating part CM may be disposed under the support part SM. The accommodating part CM may include a first accommodating part S-CM1 disposed under the first support part S-SM1 and a second accommodating part S-CM2 disposed under the second support part S-SM2. The accommodating part CM may accommodate the display module DM including the display panel DP and the support part SM.

The first accommodating part S-CM1 may be slid and then accommodated in the second accommodating part S-CM2 when the display module DM is folded. That is, the accommodating part CM may be in an open state (corresponding to the unfolded state) before the first accommodating part S-CM1 slides into the second accommodating part S-CM2 and in a closed state (corresponding to the folded state) after the first accommodating part S-CM1 slides into and is accommodated in the second accommodating part S-CM2. In the open state, the accommodating part CM may cover the entire rear surface of the display module DM that is in the unfolded state, and in the closed state, the accommodating part CM may cover the first display portion DA1 of the display module DM.

Figure 3A:
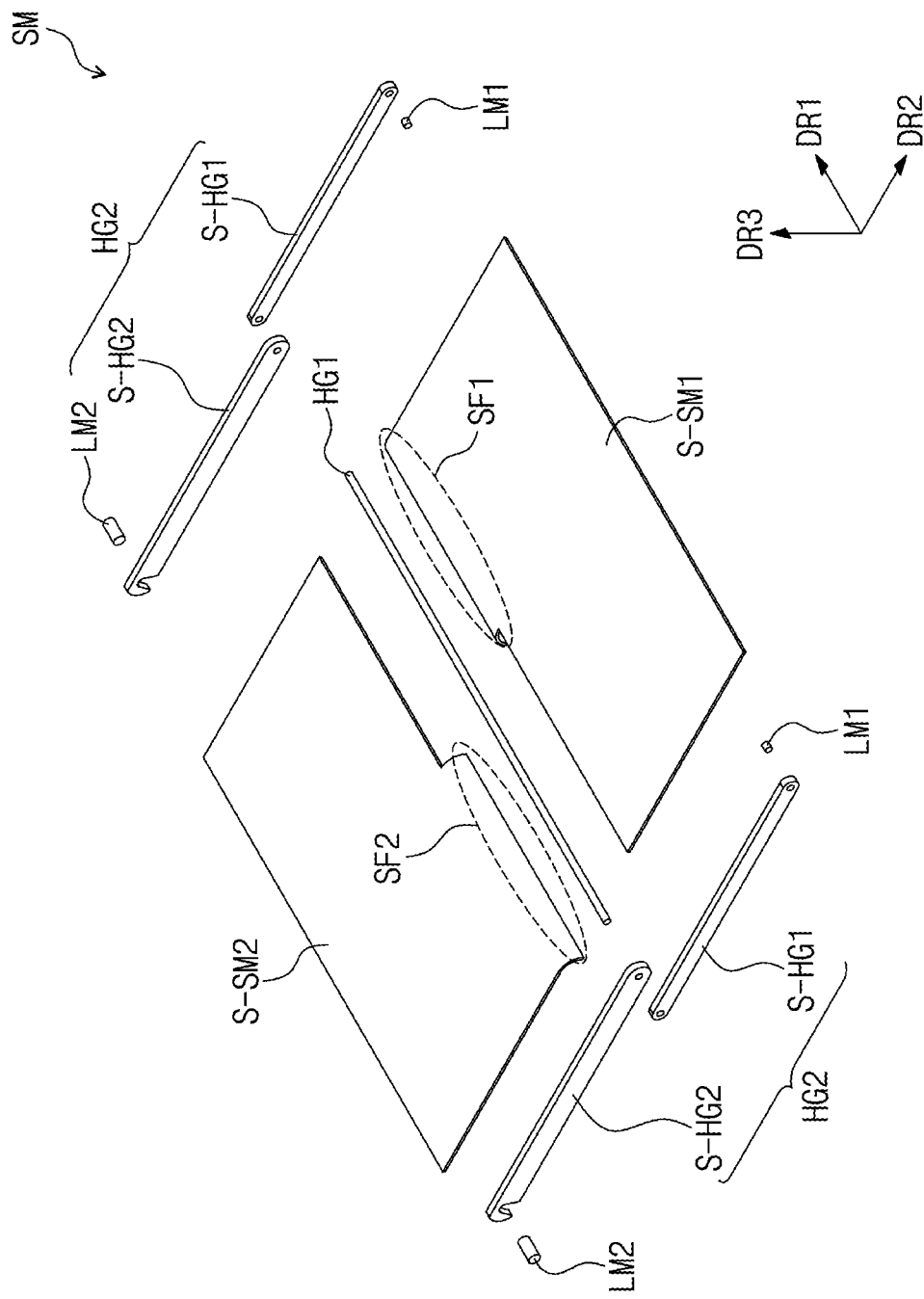
FIG. 3A is an exploded perspective view showing a support part according to an embodiment of the present disclosure.
Figure 3B:
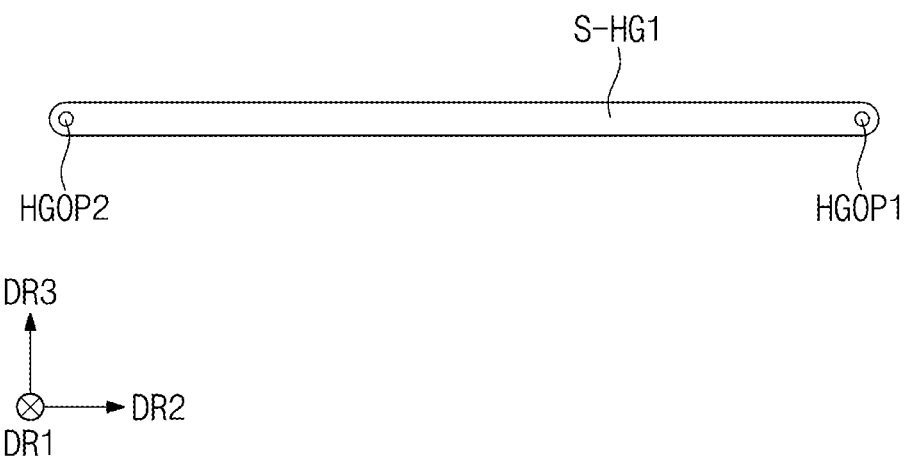
FIG. 3B is a side view showing a first edge rotating part according to an embodiment of the present disclosure.
Figure 3C:
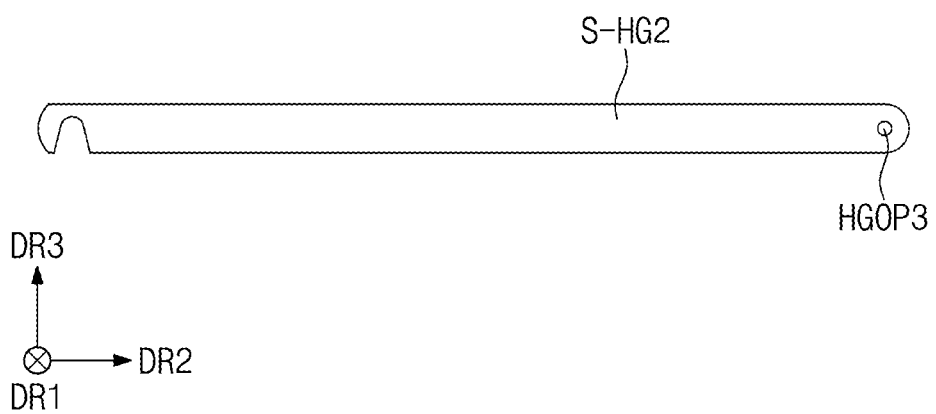
FIG. 3C is a side view showing a second edge rotating part according to an embodiment of the present disclosure.

FIG. 3A is an exploded perspective view showing the support part SM according to an embodiment of the present disclosure, FIG. 3B is a side view showing a first edge rotating part S-HG1 according to an embodiment of the present disclosure, and FIG. 3C is a side view showing a second edge rotating part S-HG2 according to an embodiment of the present disclosure.

Referring to FIGS. 3A to 3C, the support part SM may include the first support part S-SM1, the second support part S-SM2, a center rotating part HG1, two edge rotating parts HG2, a first engaging part LM1, and a second engaging part LM2.

The first support part S-SM1 and the second support part S-SM2 may include a first curved surface SF1 and a second curved surface SF2, respectively, which overlap portions of the folding area FA in a plan view. The first curved surface SF1 and the second curved surface SF2 may be spaced apart from each other in the first direction DR1.

The center rotating part HG1 may overlap the folding axis FX and may extend in the first direction DR1 in a plan view.

The center rotating part HG1 may be disposed between the first support part S-SM1 and the second support part S-SM2. The center rotating part HG1 may be accommodated to overlap the first curved surface SF1 of the first support part S-SM1 and the second curved surface SF2 of the second support part S-SM2, in a plan view.

The two edge rotating parts HG2 may be spaced apart from each other in the first direction DR1 with the center rotating part HG1 interposed therebetween. Each of the two edge rotating parts HG2 may include the first edge rotating part S-HG1 and the second edge rotating part S-HG2. The first edge rotating part S-HG1 may be disposed adjacent to the first accommodating part S-CM1, and the second edge rotating part S-HG2 may be disposed adjacent to the second accommodating part S-CM2.

The first edge rotating part S-HG1 may be provided with a first insertion hole HGOP1 defined in one side thereof and a second insertion hole HGOP2 in the other side thereof. The second insertion hole HGOP2 is spaced apart from the first insertion hole HGOP1 in the second direction DR2. The second edge rotating part S-HG2 may be provided with a third insertion hole HGOP3 defined in one side thereof and may have a hook shape at the other side thereof. The hook shape is spaced apart from the third insertion hole HGOP3 in the second direction DR2. The second insertion hole HGOP2 and the third insertion hole HGOP3 may overlap each other in the side view from the first direction DR1. The center rotating part HG1 may be inserted into the second and third insertion holes HGOP2 and HGOP3 to couple the first and second edge rotating parts S-HG1 and S-HG2.

The center rotating part HG1 may be rotated by a user's operation. When the center rotating part HG1 is rotated, the edge rotating parts HG2 coupled to the center rotating part HG1 may be rotated. According to the operation of the edge rotating parts HG2, the first support part S-SM1 and the second support part S-SM2 disposed adjacent to the edge rotating parts HG2 may be disposed to have an included angle therebetween. As used herein, the "included angle" is defined as an angle between two planes.

The included angle between the first support part S-SM1 and the second support part S-SM2 may be within a range from about zero (0) degrees (°) to about 180 degrees (°). When the first support part S-SM1 and the second support part S-SM2 are disposed inclined with respect to the accommodating part CM to have the included angle more than zero degrees, the folding area FA of the display panel DP disposed on the support part SM may be folded with respect to the folding axis FX. As the display panel DP is folded, the included angle between the first support part S-SM1 and the second support part S-SM2 may decrease.

The first engaging part LM1 may be inserted into the first insertion hole HGOP1. The second engaging part LM2 may be inserted into and may be fixed to the hook shape of the second edge rotating part S-HG2. The first engaging part LM1 and the second engaging part LM2 will be described in detail later.

Figure 4A:
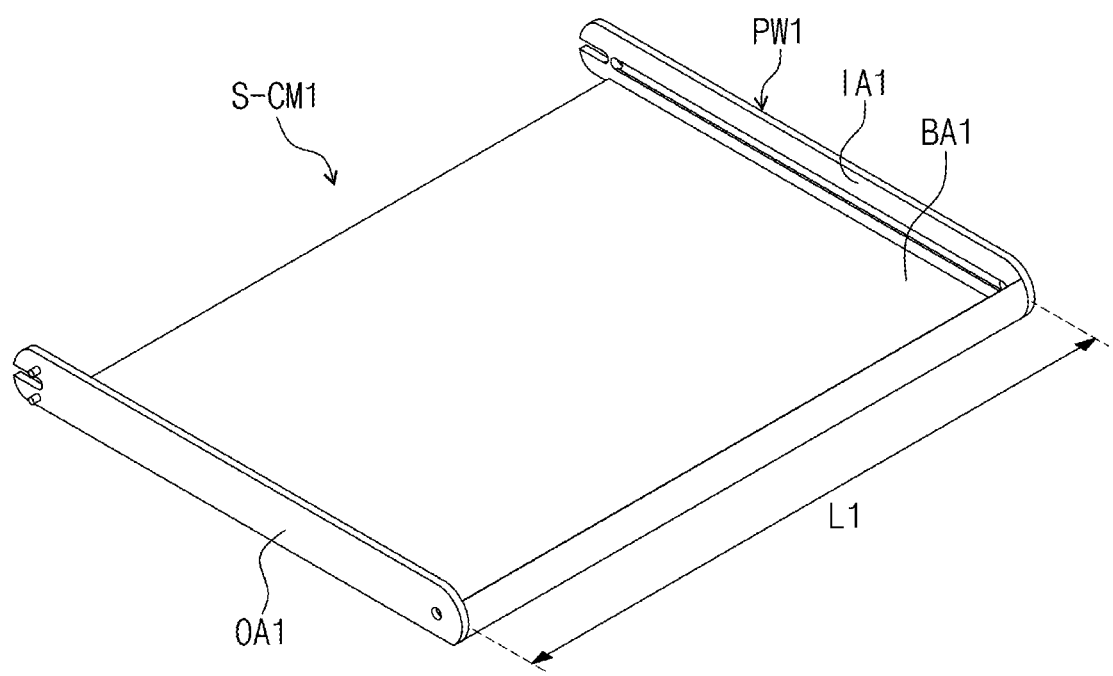
FIG. 4A is a perspective view showing a first accommodating part according to an embodiment of the present disclosure.
Figure 4A:
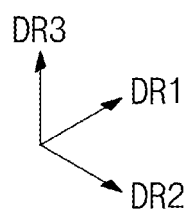

FIG. 4A is a perspective view showing the first accommodating part S-CM1 according to an embodiment of the present disclosure. Referring to FIG. 4A, the first accommodating part S-CM1 may include a first bottom surface BA1 and first barriers PW1 perpendicular to the first bottom surface BA1 and facing each other in the first direction DR1. The first barriers PW1 may refer to side surfaces of the first accommodating part S-CM1 extending in a direction substantially parallel to the second direction DR2. Each of the first barriers PW1 may include a first inner side surface IA1 and a first outer side surface OA1 opposite to the first inner side surface IA1. The first accommodating part S-CM1 may include a first surface extending in the first direction DR1 and having a first length L1. The first barriers PW1 facing each other in the first direction DR1 may have the same shape as each other.

Figure 4B:
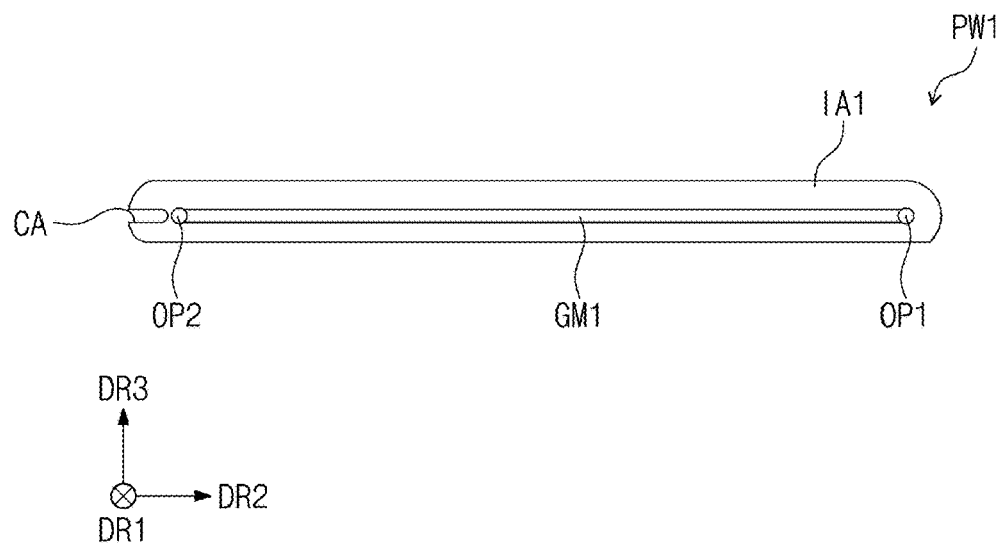
FIG. 4B is a side view showing a first inner side surface of the first accommodating part according to an embodiment of the present disclosure.

FIG. 4B is a side view showing the first inner side surface IA1 of the first accommodating part S-CM1 according to an embodiment of the present disclosure. The first barrier PW1 in FIG. 4B corresponds to the first barrier PW1 that is disposed right with respect to the first bottom surface BA1 in FIG. 4A. The first inner side surface IA1 may be provided with a first hole OP1 into which the first engaging part LM1 (refer to FIG. 3A) is inserted, a second hole OP2 spaced apart from the first hole OP1 in the second direction DR2, and a first guide part GM1 defined between the first hole OP1 and the second hole OP2 and extending in the second direction DR2. The first and second holes OP1 and OP2 may penetrate the first inner side surface IA1 and the first outer side surface OA1 of the first barriers PW1.

The first guide part GM1 may be concavely defined (i.e., recessed) in a direction from the first inner side surface IA1 to the first outer side surface OA1 (i.e., the first direction DR1). The first guide part GM1 may be a path through which the first engaging part LM1 (refer to FIG. 3A) moves between the second hole OP2 and the first hole OP1 in the second direction DR2. In the present embodiment, the first guide part GM1 is defined as a concave part, however, this is merely exemplary, and the present disclosure according to the invention should not be limited thereto or thereby. Although not shown in figures, according to another embodiment, the first guide part GM1 may be a hole penetrating the first inner side surface IA1 and the first outer side surface OA1.

The first accommodating part S-CM1 may be provided with a concave portion CA defined at one end thereof, which is adjacent to the second accommodating part S-CM2, and the concave portion CA is recessed toward the second hole OP2. The concave portion CA may have substantially the same width as that of the second hole OP2 in a thickness direction (i.e., third direction DR3).

Figure 4C:
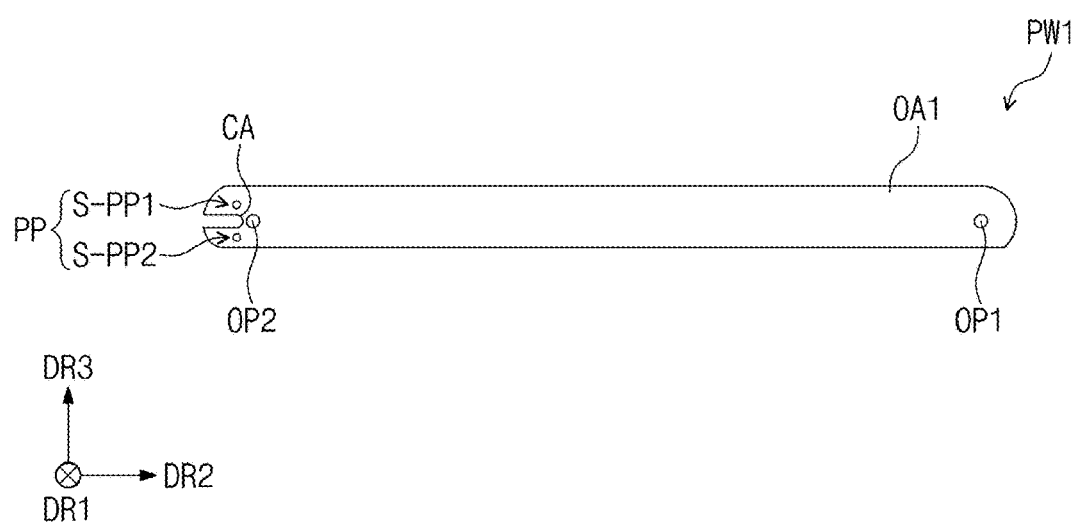
FIG. 4C is a side view showing a first outer side surface of the first accommodating part according to an embodiment of the present disclosure.

FIG. 4C is a side view showing the first outer side surface OA1 of the first accommodating part S-CM1 according to an embodiment of the present disclosure. The first barrier PW1 in FIG. 4C corresponds to the first barrier PW1 that is disposed left with respect to the first bottom surface BA1 in FIG. 4A. The first outer side surface OA1 may be provided with a protrusion part PP protruded from one end thereof, which is adjacent to the second accommodating part S-CM2. The protrusion part PP may include a first protrusion part S-PP1 and a second protrusion part S-PP2 spaced apart from the first protrusion part S-PP1 with the second hole OP2 interposed therebetween in the thickness direction (i.e., the third direction DR3), however, this is merely exemplary, and the present disclosure according to the invention should not be limited thereto or thereby. As another way, the protrusion part PP may be provided in a singular or plural number in another embodiment.

Figure 4D:
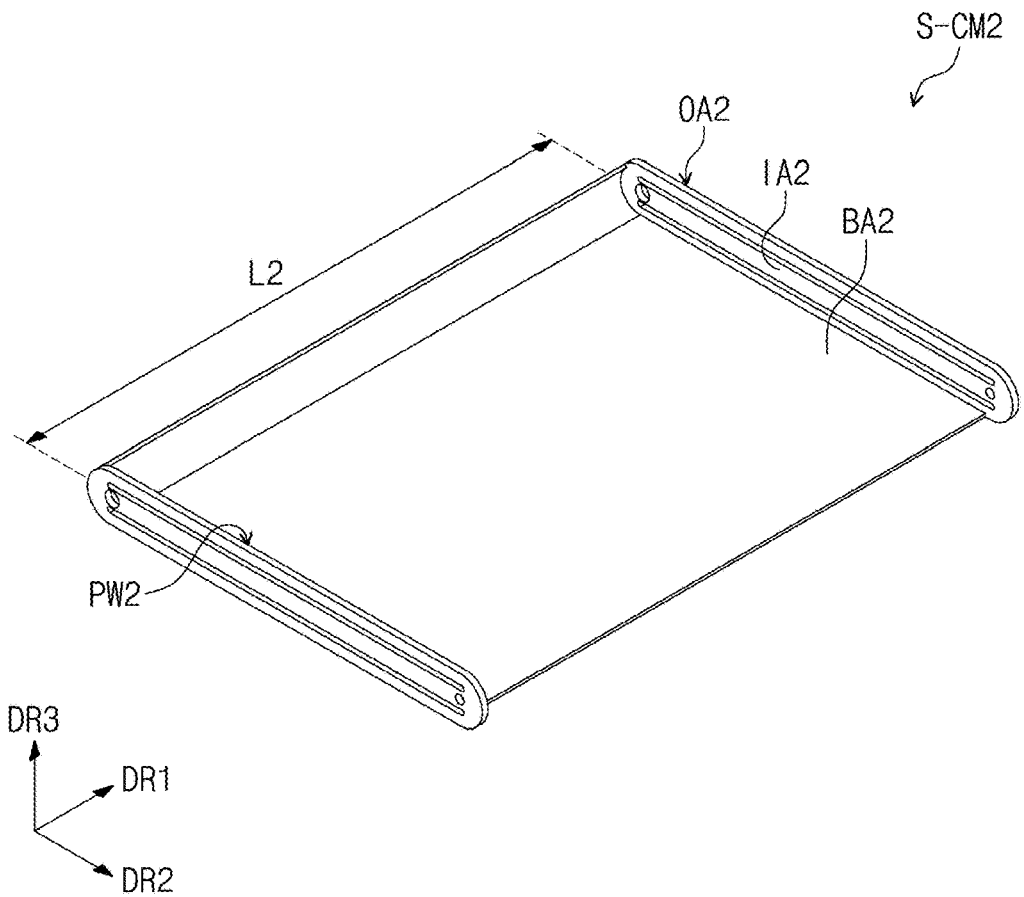
FIG. 4D is a perspective view showing a second accommodating part according to an embodiment of the present disclosure.

FIG. 4D is a perspective view showing the second accommodating part S-CM2 according to an embodiment of the present disclosure. Referring to FIG. 4D, the second accommodating part S-CM2 may include a second bottom surface BA2 and second barriers PW2 perpendicular to the second bottom surface BA2 and facing each other in the first direction DR1. The second barriers PW2 may refer to side surfaces of the second accommodating part S-CM2 extending in a direction substantially parallel to the second direction DR2.

Each of the second barriers PW2 may include a second inner side surface IA2 and a second outer side surface OA2 opposite to the second inner side surface IA2. The second accommodating part S-CM2 may include a second surface extending in the first direction DR1 and having a second length L2 greater than the first length L1 of the first surface (refer to FIG. 4A). The second barriers PW2 facing each other in the first direction DR1 may have the same shape as each other.

Figure 4E:
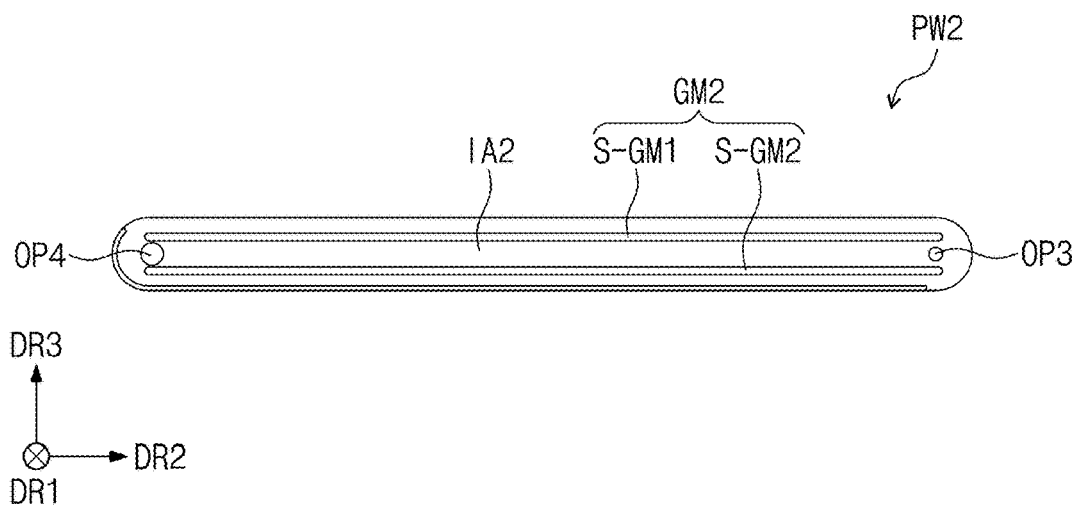
FIG. 4E is a view showing a second barrier of the second accommodating part according to an embodiment of the present disclosure.

FIG. 4E is a view showing the second barrier PW2 of the second accommodating part S-CM2 according to an embodiment of the present disclosure. The second barrier PW2 in FIG. 4E corresponds to the second barrier PW2 that is disposed right with respect to the second bottom surface BA2 in FIG. 4D. Referring to FIG. 4E, the second barrier PW2 may be provided with a third hole OP3, a fourth hole OP4, and second guide part GM2. The third hole OP3 may be defined in one side thereof and overlapping the concave portion CA in the unfolded state in the first direction DR1, the fourth hole OP4 may be spaced apart from the third hole OP3 in the second direction DR2, and the second guide part GM2 may overlap the protrusion part PP (refer to FIG. 4C) in the first direction DR1 and extend in the second direction DR2. The second engaging part LM2 (refer to FIG. 3A) may be inserted into the fourth hole OP4.

The third hole OP3 and the fourth hole OP4 may penetrate the second inner side surface IA2 and the second outer side surface OA2 of the second barrier PW2.

The second guide part GM2 may be defined through the second inner side surface IA2 and the second outer side surface OA2 of the second barrier PW2. The second guide part GM2 may serve as a path through which the protrusion part PP (refer to FIG. 4C) slides to the second direction DR2 by the user's operation. The second guide part GM2 may include a first sub-guide part S-GM1 and a second sub-guide part S-GM2 spaced apart from the first sub-guide part S-GM1 with the third and fourth holes OP3 and OP4 interposed therebetween in the thickness direction (i.e., the third direction DR3). However, this is merely exemplary, and the present disclosure according to the invention should not be limited thereto or thereby. The second guide part GM2 may be provided in a singular number or may include a plurality of sub-guide parts in another embodiment.

Figure 5A:
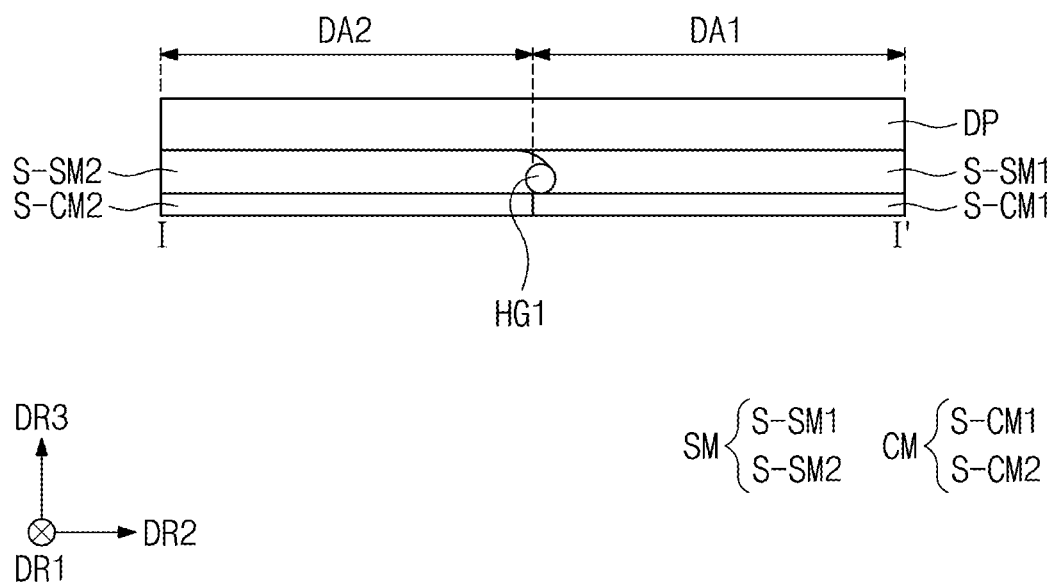
FIG. 5A is a cross-sectional view showing an electronic device according to an embodiment of the present disclosure.

FIG. 5A is a cross-sectional view taken along line I-I' of FIG. 1A to show the electronic device in an unfolded state according to an embodiment of the present disclosure. FIG. 5B is a side view showing an outer side surface of the electronic device of FIG. 5A, and FIG. 5C is a side view showing an inner side surface of the electronic device. In FIGS. 5A to 5C, the same descriptions as those of FIGS. 1A to 4E will be omitted, and different features will be mainly described. Hereinafter, the electronic device DD in the unfolded state will be described in detail with reference to FIGS. 5A to 5C.

Referring to FIG. 5A, the first display portion DA1 may overlap the first accommodating part S-CM1, and the second display portion DA2 may overlap the second accommodating part S-CM2 in a plan view in a first state (i.e., the unfolded state) in which the first and second display portions DA1 and DA2 of the electronic device DD are disposed on the same plane.

Referring to FIGS. 5B and 5C, when the electronic device DD is in the first state, the first engaging part LM1 may be inserted into the first hole OP1, and the protrusion part PP may be inserted into one side of the second guide part GM2 adjacent to the third hole OP3. The second engaging part LM2 may be inserted into and may be fixed to the fourth hole OP4 in both the folded state and the unfolded state.

Figure 6A:
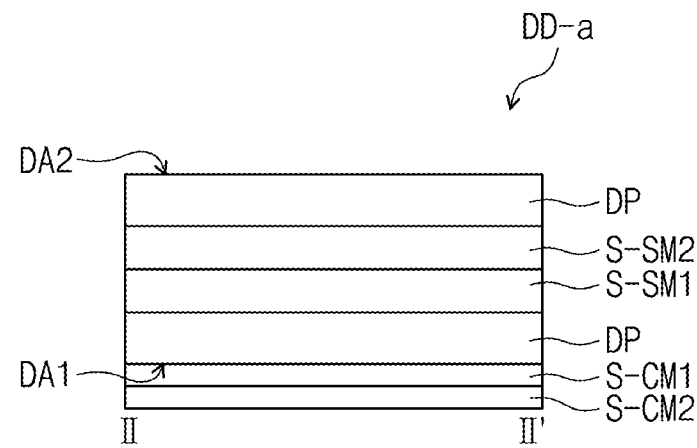
FIG. 6A is a cross-sectional view showing a folded electronic device according to an embodiment of the present disclosure.
Figure 6B:
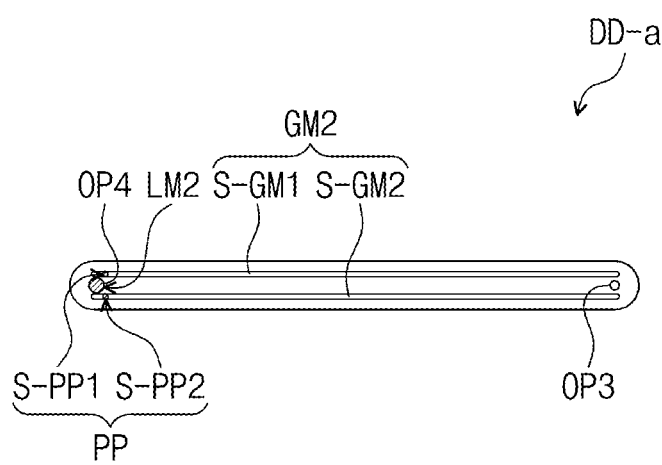
FIG. 6B is a side view showing an outer side surface of the electronic device of FIG. 6A.
Figure 6C:
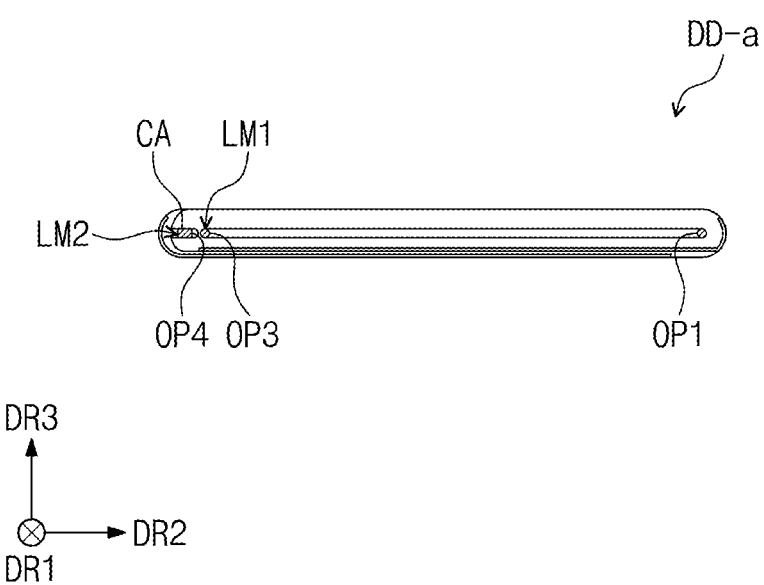
FIG. 6C is a side view showing an inner side surface of the electronic device of FIG. 6A.

FIG. 6A is a cross-sectional view taken along line II-II' of FIG. 1B to show the electronic device DD-a in the completely folded state according to an embodiment of the present disclosure, FIG. 6B is a side view showing an outer side surface of the accommodating part of the electronic device DD-a in the folded state, and FIG. 6C is a side view showing an inner side surface of the electronic device DD-a in the folded state.

Referring to FIG. 6A, when the electronic device DD-a is in a second state (i.e., the completely folded state) in which the electronic device DD-a is completely folded to allow the first display portion DA1 to overlap the second display portion DA2 in a plan view, the second display portion DA2, the first display portion DA1, the first bottom surface BA1 (which is a part of the first accommodating part S-CM1), and the second bottom surface BA2 (which is a part of the second accommodating part S-CM2) may overlap with each other in a plan view. In the second state (i.e., the completely folded state), the first support part S-SM1 and the second support part S-SM2 may be disposed to overlap each other due to the rotation of the center rotating part HG1 and the operation of the two edge rotating parts HG2, which is caused by the rotation of the center rotating part HG1, in the first state, and the first display portion DA1 and the second display portion DA2 may be disposed to overlap each other in a plan view due to the folding of the display panel DP disposed on the support part SM. Referring to FIGS. 6B and 6C, the concave portion CA may be located adjacent to the fourth hole OP4 when the electronic device DD-a is in the second state. The first engaging part LM1 may be engaged with the second hole OP2. The protrusion part PP may be inserted into one side of the second guide part GM2, which is adjacent to the fourth hole OP4.

Figure 7A:
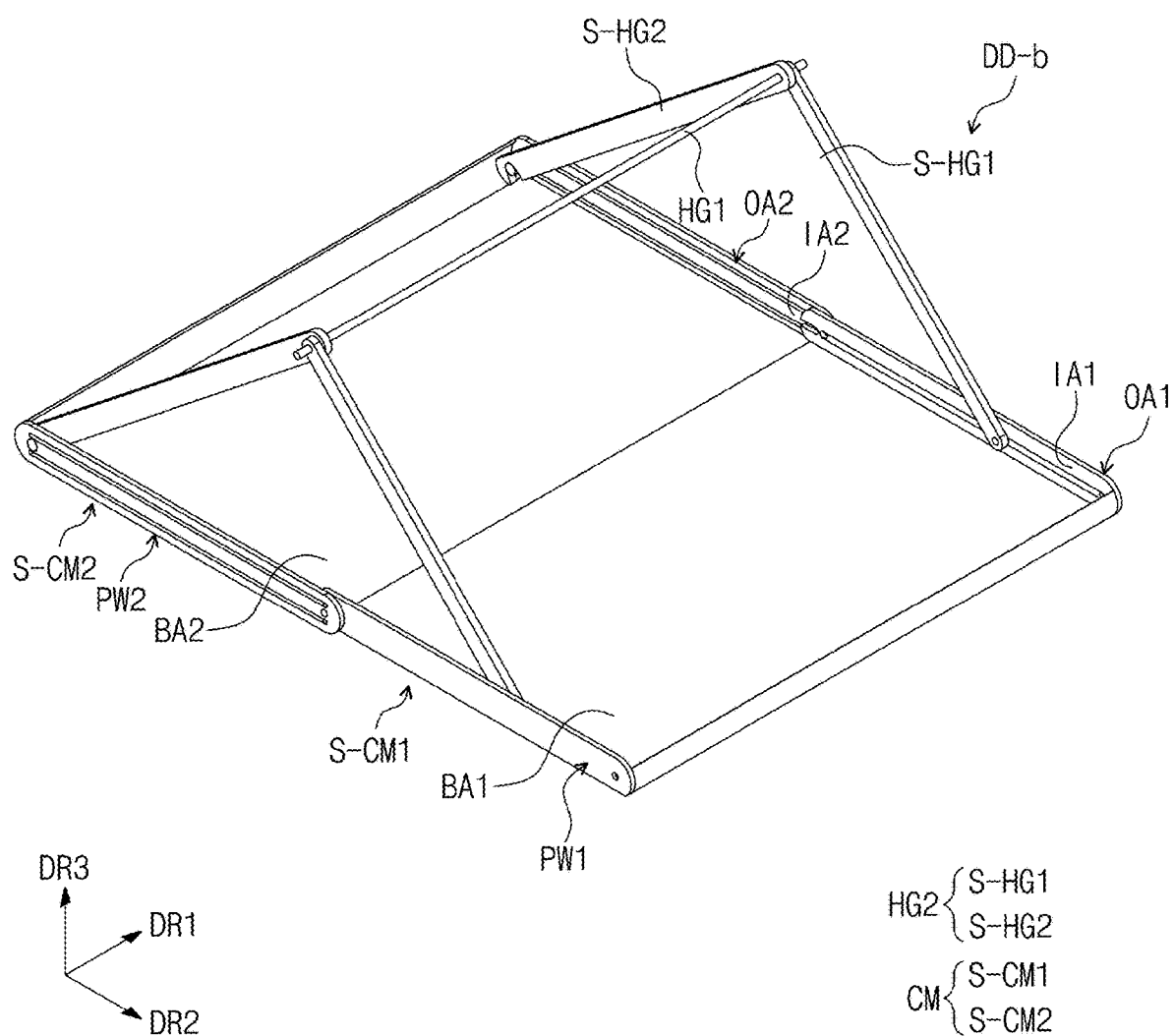
FIG. 7A is a perspective view showing a portion of an electronic device according to an embodiment of the present disclosure.
Figure 7B:
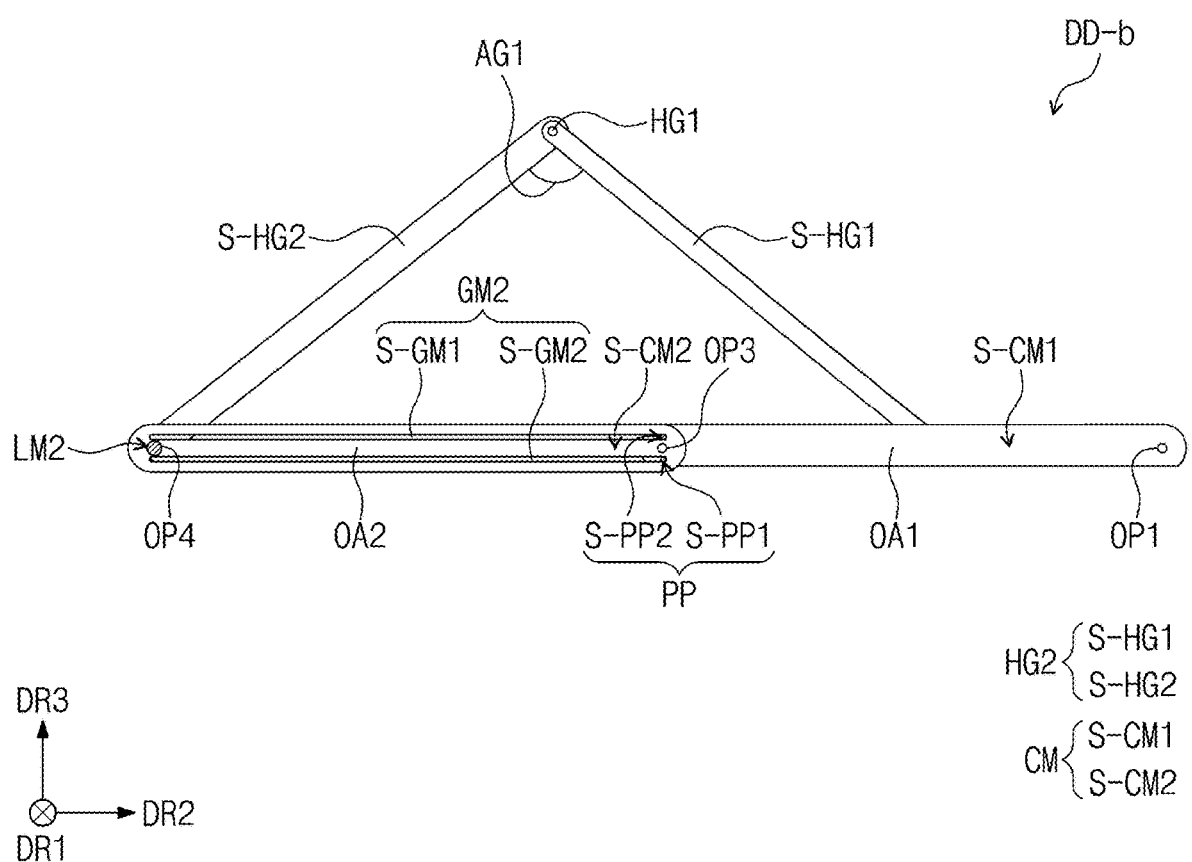
FIG. 7B is a side view showing an outer side surface of the electronic device of FIG. 7A.
Figure 7C:
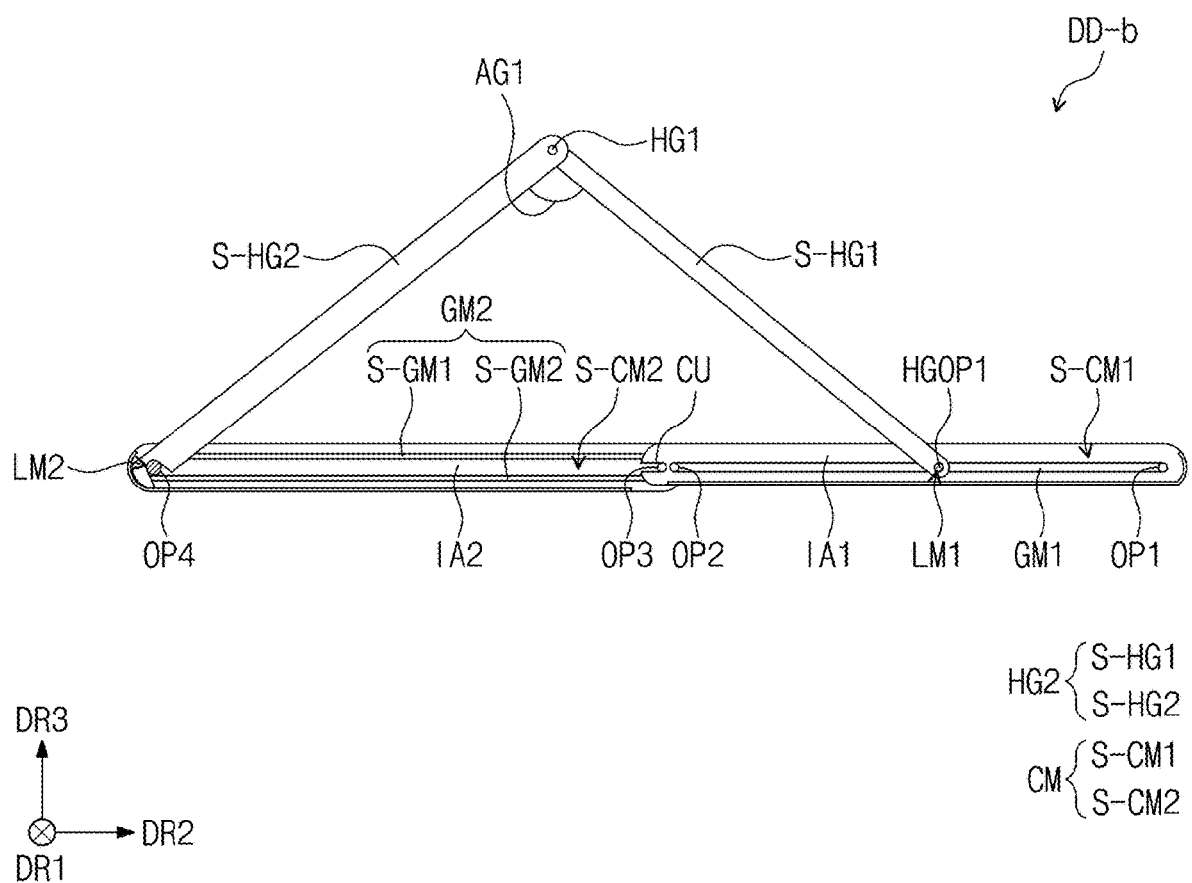
FIG. 7C is a side view showing an inner side surface of the electronic device of FIG. 6A.

FIG. 7A is a perspective view showing a portion of an electronic device DD-b in a third state (i.e., one of intermediately folded states) according to an embodiment of the present disclosure, FIG. 7B is a side view showing an outer side surface of the electronic device DD-b of FIG. 7A, and FIG. 7C is a side view showing an inner side surface of the electronic device DD-b of FIG. 7A. Hereinafter, the electronic device DD-b in the third state will be described in detail with reference to FIGS. 7A to 7C.

Referring to FIG. 7A, when the electronic device DD-b is in the third state that is an intermediate state between the first state (i.e., the unfolded state) and the second state (i.e., the completely folded state), the folding area FA of the display module DM of the electronic device DD-b may be spaced apart from the first accommodating part S-CM1 and the second accommodating part S-CM2 in a thickness direction (the third direction DR3). The first display portion DA1 (refer to FIG. 2) and the second display portion DA2 (refer to FIG. 2) of the display module DM may be disposed to have a first included angle AG1. In an embodiment, the first included angle AG1 may be greater than about 70 degrees (°) and smaller than about 180 degrees (°). The display panel DP (refer to FIG. 2) and the support part SM(refer to FIG. 2) are omitted from FIGS. 7A to 7C to show a position relationship between the center rotating part HG1, the two edge rotating parts HG2, and the accommodating part CM. A surface defined by the center rotating part HG1, the first edge rotating parts S-HG1, and a virtual line connecting two points where the first accommodating part S-CM1 and the first edge rotating parts S-HG1 meet may correspond to the first display portion DA1 (refer to FIG. 2), and a surface defined by the center rotating part HG1, the second edge rotating parts S-HG2, and a virtual line connecting two points where the second accommodating part S-CM2 and the second edge rotating parts S-HG2 meet may correspond to the second display portion DA2 (refer to FIG. 2). Hereinafter, an angle defined by the first display portion DA1 (refer to FIG. 2) and the second display portion DA2 (refer to FIG. 2) (i.e., the included angle) may be defined as being the same as an angle defined by the first edge rotating part S-HG1 and the second edge rotating part S-HG2.

Referring to FIGS. 7B and 7C, the first engaging part LM1 coupled to one end of the first edge rotating part S-HG1 may be inserted into the first guide part GM1 in the electronic device DD-b. When the center rotating part HG1 is rotated in the first state, the edge rotating parts HG2 may be disposed to be inclined with respect to the accommodating part CM and may have the first included angle AG1, and thus, the electronic device DD-b may be in the third state. When the edge rotating parts HG2 are disposed to be more inclined with respect to the accommodating part CM in the third state than in the first state, the first engaging part LM1 coupled to the first edge rotating part S-HG1 may slide in the second direction DR2 from the first hole OP1, and then, may be inserted into the first guide part GM1.

Figure 8A:
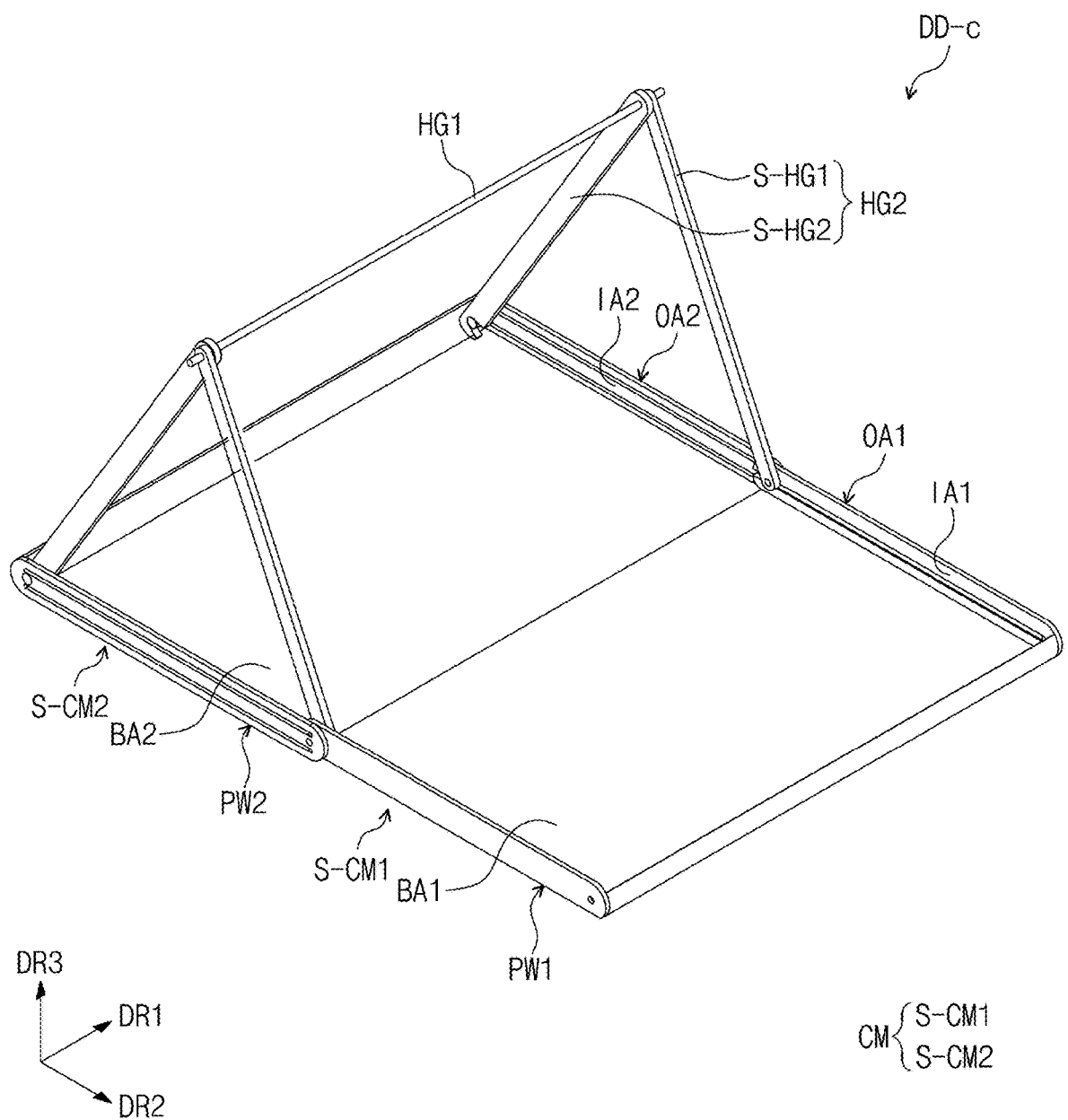
FIG. 8A is a perspective view showing a portion of an electronic device according to an embodiment of the present disclosure.
Figure 8B:
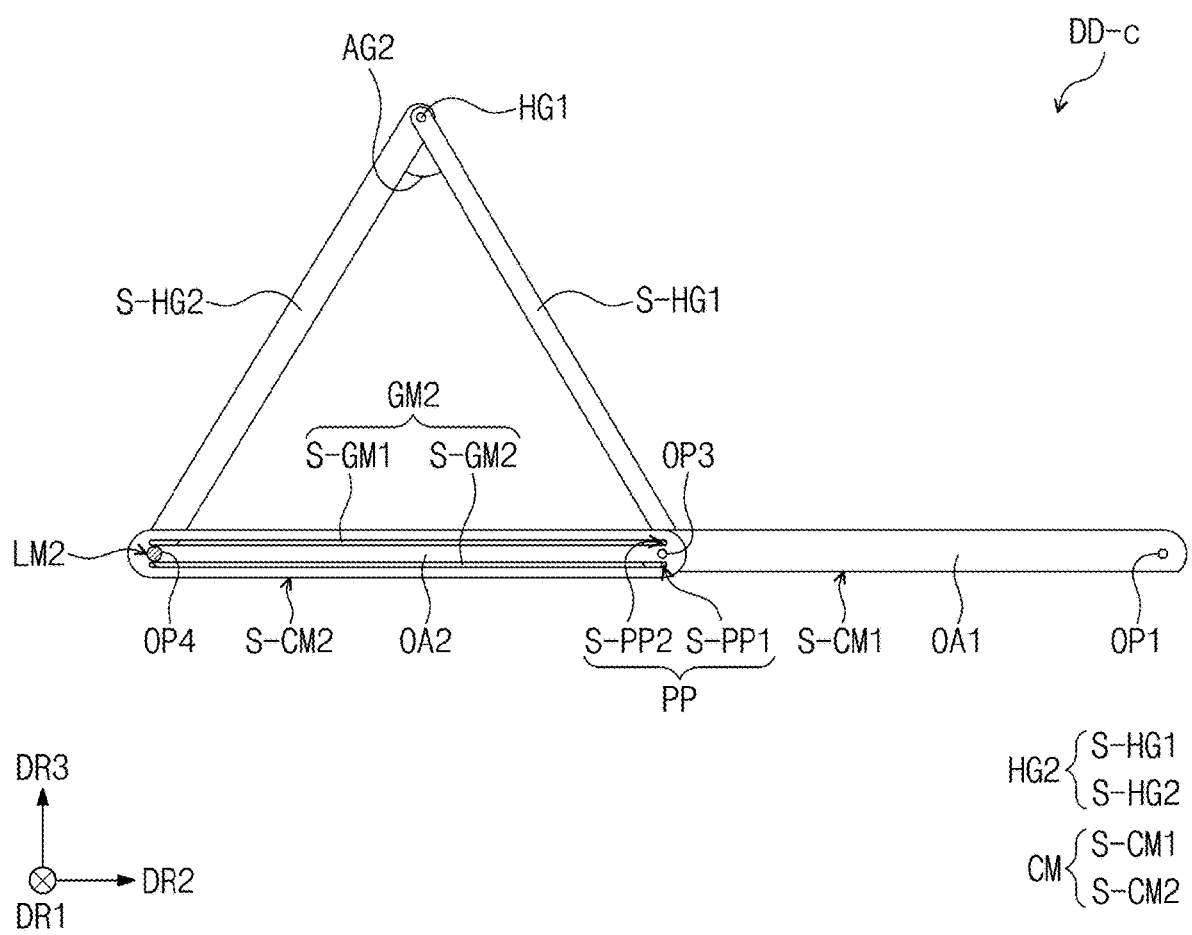
FIG. 8B is a side view showing an outer side surface of the electronic device of FIG. 8A.
Figure 8C:
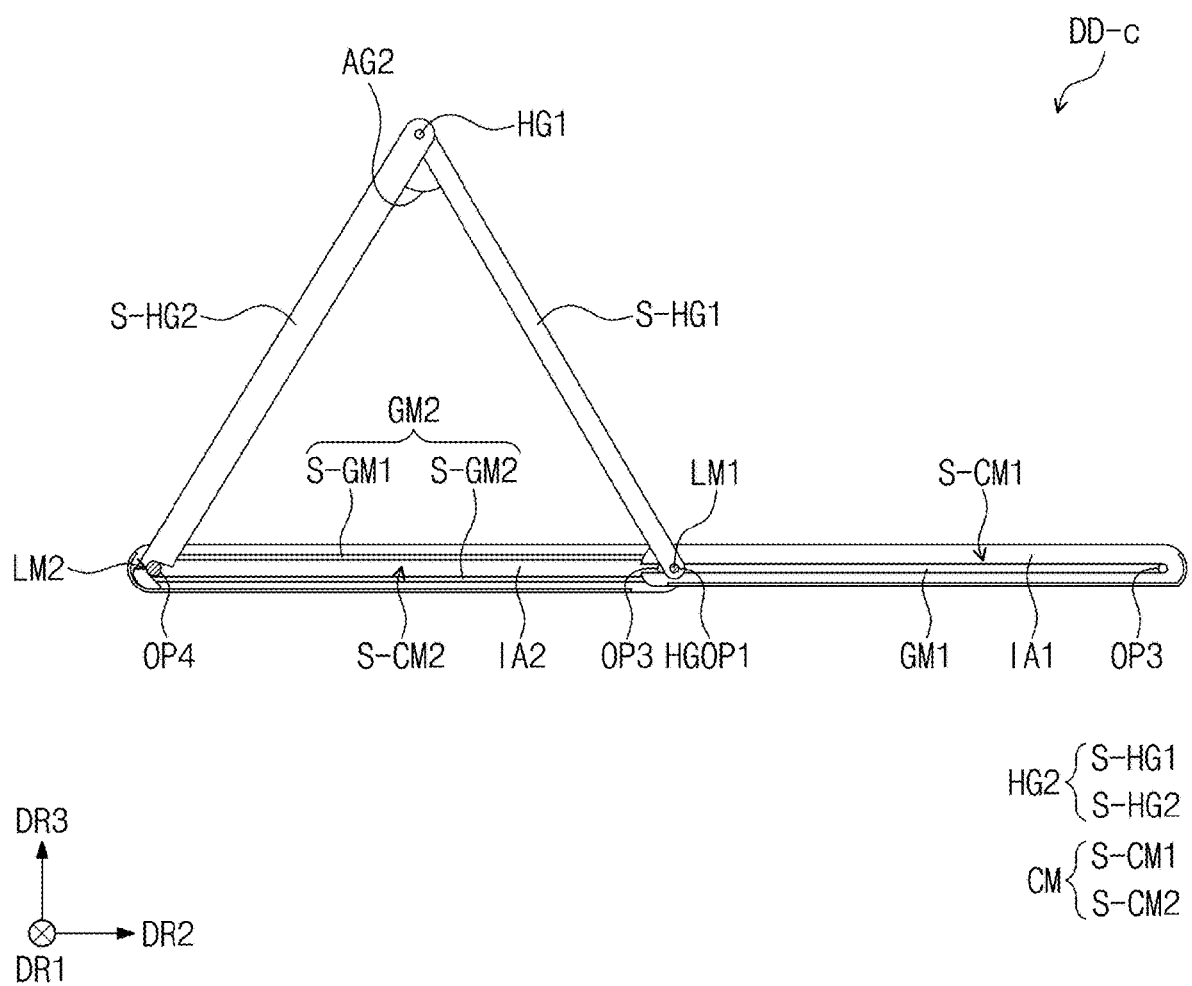
FIG. 8C is a side view showing an inner side surface of the electronic device of FIG. 8A.

FIG. 8A is a perspective view showing a portion of an electronic device DD-c in a fourth state (i.e., another of intermediately folded states) according to an embodiment of the present disclosure, FIG. 8B is a side view showing an outer side surface of the electronic device DD-c of FIG. 8A, and FIG. 8C is a side view showing an inner side surface of the electronic device DD-c of FIG. 8A. Hereinafter, the electronic device DD-c in the fourth state will be described in detail with reference to FIGS. 8A to 8C.

Referring to FIG. 8A, when the electronic device DD-c is in the fourth state that is an intermediate state between the third state and the second state (i.e., the completely folded state), the folding area FA of the display module DM of the electronic device DD-c may be further spaced apart from the first accommodating part S-CM1 and the second accommodating part S-CM2 in the thickness direction (i.e., the third direction DR3) than in the third state. The first edge rotating part S-HG1 and the second edge rotating part S-HG2 may be disposed to be more inclined with respect to the accommodating part CM to have a second included angle AG2 smaller than the first included angle AG1. In an embodiment, the second included angle AG2 may be equal to or greater than about 50 degrees (°) and equal to or smaller than about 70 degrees (°).

Referring to FIGS. 8B and 8C, the first engaging part LM1 may be inserted into the second hole OP2 in the electronic device DD-c. When the edge rotating parts HG2 are disposed to be more inclined with respect to the accommodating part CM in the fourth state than that in the third state, the first engaging part LM1 coupled to the first edge rotating part S-HG1 may slide along the second direction DR2 in the first guide part GM1, and thus, may be inserted into the second hole OP2.

Figure 9A:
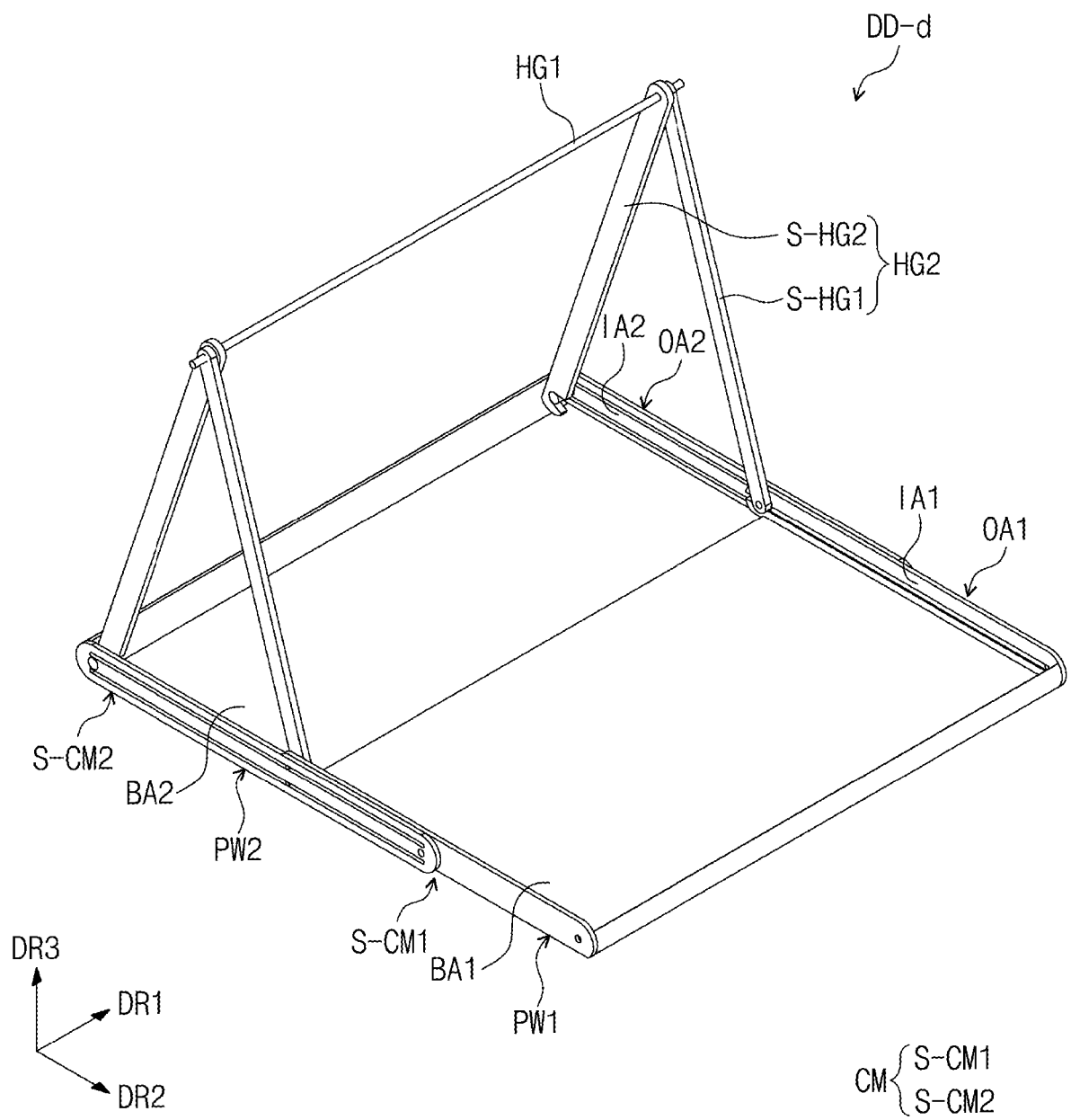
FIG. 9A is a perspective view showing a portion of an electronic device according to an embodiment of the present disclosure.
Figure 9B:
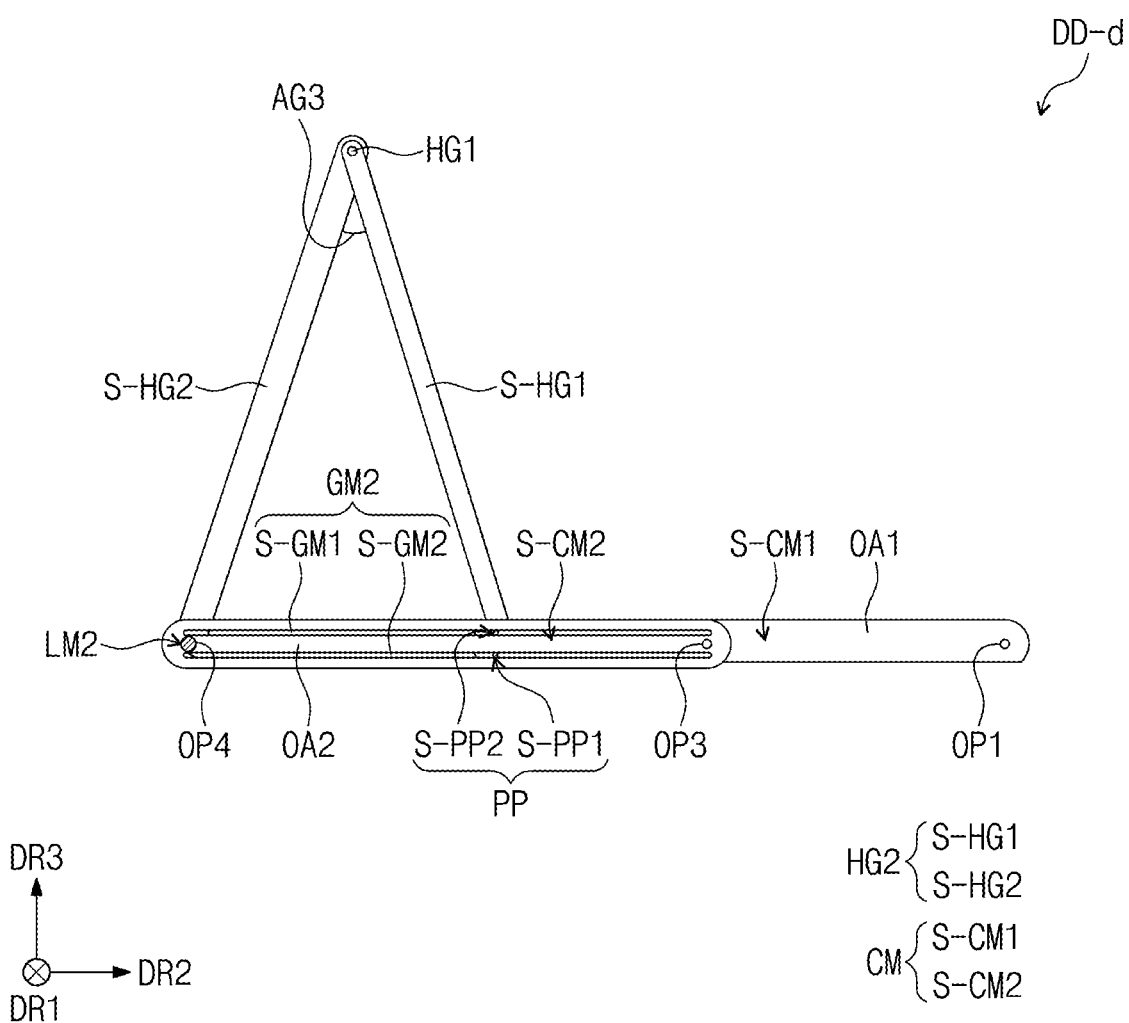
FIG. 9B is a side view showing an outer side surface of the electronic device of FIG. 9A.
Figure 9C:
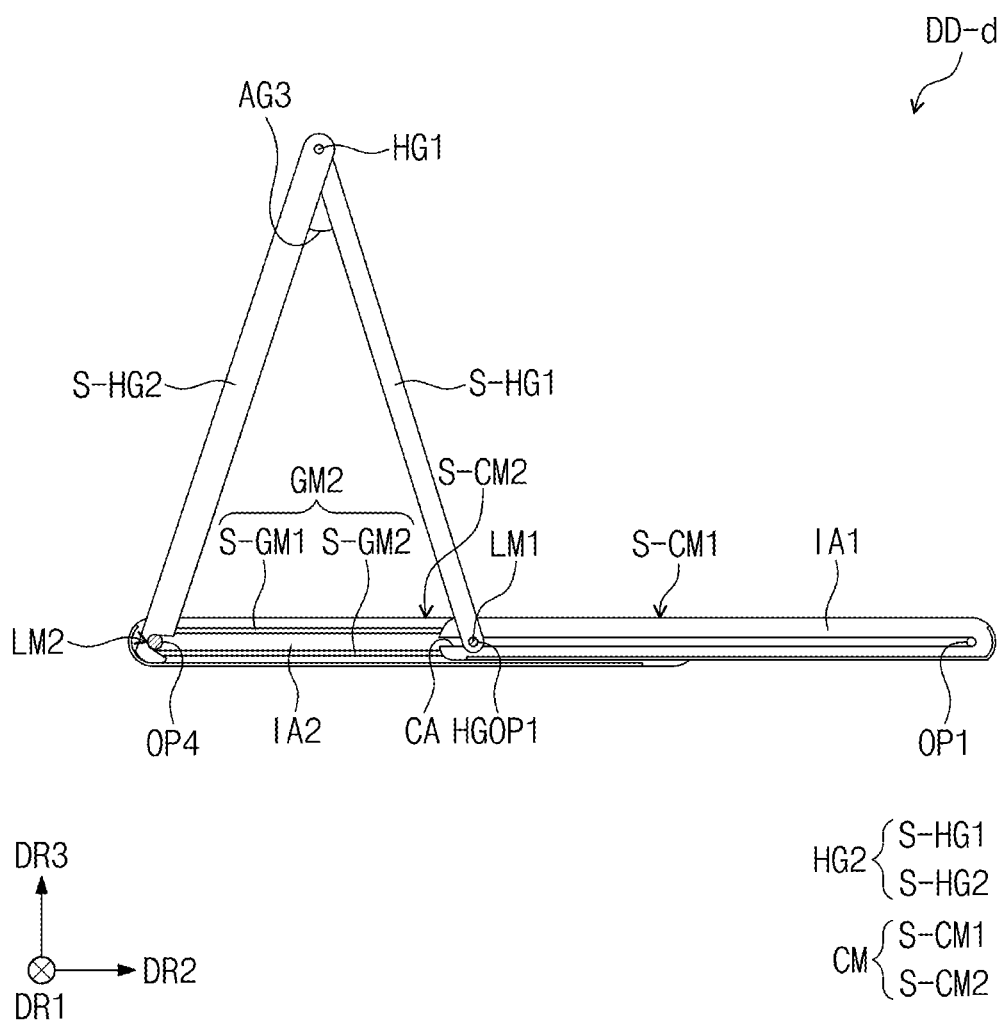
FIG. 9C is a side view showing an inner side surface of the electronic device of FIG. 9A.

FIG. 9A is a perspective view showing a portion of an electronic device DD-d in a fifth state (i.e., still another of intermediately folded states) according to an embodiment of the present disclosure, FIG. 9B is a side view showing an outer side surface of the electronic device DD-d of FIG. 9A, and FIG. 9C is a side view showing an inner side surface of the electronic device DD-d of FIG. 9A. Hereinafter, the electronic device DD-d in the fifth state will be described in detail with reference to FIGS. 9A to 9C.

Referring to FIG. 9A, when the electronic device DD-d is in the fifth state that is an intermediate state between the fourth state and the second state (i.e., the completely folded state), the display module DM may be further spaced apart from the first accommodating part S-CM1 and the second accommodating part S-CM2 in the thickness direction (i.e., the third direction DR3) than in the fourth state. The first edge rotating part S-HG1 and the second edge rotating part S-HG2 may be disposed to be more inclined with respect to the accommodating part CM to have a third included angle AG3 smaller than the second included angle AG2. In an embodiment, the third included angle AG3 may be equal to or greater than about 0 degrees (°) and smaller than about 50 degrees (°). The area in which the first accommodating part S-CM1 overlaps the second accommodating part S-CM2 in the first direction DR1 may increase in the fifth state compared with that in the fourth state, and the area in which the first accommodating part S-CM1 is exposed to the outside may decrease in the fifth state compared with that in the fourth state.

Referring to FIGS. 9B and 9C, the protrusion part PP inserted into the second guide part GM2 may move to the fourth hole OP4 from the third hole OP3 while the fourth state is changed to the second state (i.e., the completely folded state). That is, the protrusion part PP may move from one end of the second guide part GM2, which is adjacent to the third hole OP3, to the other end of the second guide part GM2, which is adjacent to the fourth hole OP4, in the fifth state.

When the edge rotating parts HG2 are disposed to be more inclined with respect to the accommodating part CM in the fifth state than that in the fourth state, the first accommodating part S-CM1 coupled to the first edge rotating part S-HG1 by the first engaging part LM1 may slide toward the second accommodating part S-CM2. The operation in which the first accommodating part S-CM1 slides to the second accommodating part S-CM2 may mean that the protrusion part PP slides along the second guide part GM2.

The changing from the fifth state to the second state (i.e., the completely folded state) may mean that the included angle between the first edge rotating part S-HG1 and the second edge rotating part S-HG2 is changed from the third included angle AG3 to zero. That is, the included angle between the first edge rotating part S-HG1 and the second edge rotating part S-HG2 may decrease as the first state is changed to the second state (i.e., the completely folded state).

According to the embodiment, the electronic device DD includes the display module DM that includes the first and second display portions DA1 and DA2 distinguished from each other with respect to the folding axis FX and the accommodating part CM that slides along the second direction DR2. Accordingly, the second display portion DA2 is exposed to the outside in the folded state, and the first display portion DA1 is covered by the accommodating part CM in the folded state, thereby protecting the portion of the display surface from the external impacts.

Although the embodiments of the present disclosure have been described, it is understood that the present disclosure should not be limited to these embodiments but various changes and modifications can be made by one ordinary skilled in the art within the spirit and scope of the present disclosure as hereinafter claimed. Therefore, the disclosed subject matter should not be limited to any single embodiment described herein, and the scope of the present inventive concept shall be determined according to the attached claims.

What is claimed is:
1. An electronic device comprising:
a display module comprising a display panel foldable with respect to a folding axis extending in a first direction and a support part disposed under the display panel; and
an accommodating part which accommodates the display module, the display panel comprising:
a first display portion covered by the accommodating part in a folded state of the display panel; and
a second display portion exposed to an outside in the folded state of the display panel, the accommodating part comprising:
a first accommodating part which accommodates the first display portion in the folded state; and
a second accommodating part which accommodates the first accommodating part in the folded state,
wherein the first accommodating part comprises a first bottom surface and first barriers substantially perpendicular to the first bottom surface, the second accommodating part comprises a second bottom surface and second barriers substantially perpendicular to the second bottom surface, wherein, as the display panel is folded, an included angle between the first display portion and the second display portion decreases, and an area in which the first accommodating part overlaps the second accommodating part increases in a plan view, and an included angle between the first bottom surface and the second bottom surface remain the same.

2. The electronic device of claim 1, wherein the support part comprises:
a first support part;
a second support part spaced apart from the first support part in a second direction substantially perpendicular to the first direction;
a center rotating part disposed between the first support part and the second support part and corresponding to the folding axis; and
two edge rotating parts spaced apart from each other in the first direction with the center rotating part interposed therebetween.

3. The electronic device of claim 2, wherein the accommodating part comprises:
a first accommodating part disposed under the first support part;
a second accommodating part disposed under the second support part;
a first engaging part which couples the first accommodating part and the two edge rotating parts; and
a second engaging part which couples the second accommodating part and the two edge rotating parts,
wherein
each of the first barriers defines first and second holes penetrating a first inner side surface and a first outer side surface of the first barrier, a first guide part between the first hole and the second hole and concave to the first outer side surface from the first inner side surface, and a concave portion recessed toward the second hole from one end of the each of the first barriers adjacent to the second accommodating part, and includes a protrusion part protruded from the first outer side surface adjacent to the second accommodating part,
each of the second barriers defines third and fourth holes penetrating a second inner side surface and a second outer side surface of the second barrier, and a second guide part between the third hole and the fourth hole,
the second engaging part is inserted into the fourth hole, and
the protrusion part is inserted into the second guide part.

4. The electronic device of claim 3, wherein the first and second display portions overlap the first and second accommodating parts, respectively, in a first state in which the first and second display portions are disposed on a same plane, and
the first display portion, the second display portion, the first accommodating part, and the second accommodating part overlap each other in the plan view in a second state in which the display panel is completely folded.

5. The electronic device of claim 4, wherein the first engaging part is inserted into the first hole in the first state, and the first engaging part is inserted into the second hole in the second state.

6. The electronic device of claim 4, wherein the protrusion part is inserted into a first side of the second guide part, which is adjacent to the third hole, in the first state, and the protrusion part is inserted into a second side of the second guide part, which is adjacent to the fourth hole, in the second state.

7. The electronic device of claim 4, wherein the included angle between the first display portion and the second display portion in the first state is about 180 degrees)(°, the included angle between the first display portion and the second display portion in the second state is about zero (0) degrees)(°, and the included angle between the first display portion and the second display portion gradually decreases as the first state is changed from the first state to the second state.

8. The electronic device of claim 4, wherein the first engaging part is inserted into the first guide part, and the first display portion and the second display portion are disposed to be inclined with respect to the accommodating part and have a first included angle between the first display portion and the second display portion in a third state that is an intermediate state between the first state and the second state.

9. The electronic device of claim 8, wherein the first included angle is greater than about 70 degrees (°) and smaller than about 180 degrees (°).

10. The electronic device of claim 8, wherein a position of the concave portion corresponds to the third hole, and the first display portion and the second display portion are disposed to be inclined with respect to the accommodating part and have a second included angle between the first display portion and the second display portion and smaller than the first included angle in a fourth state that is an intermediate state between the third state and the second state.

11. The electronic device of claim 10, wherein the second included angle is equal to or greater than about 50 degrees (°) and equal to or smaller than about 70 degrees (°).

12. The electronic device of claim 10, wherein the position of the concave portion is spaced apart from the third hole in the second direction, and the first display portion and the second display portion are disposed to be inclined with respect to the accommodating part and have a third included angle between the first display portion and the second display portion and smaller than the second included angle in a fifth state that is an intermediate state between the fourth state and the second state.

13. The electronic device of claim 12, wherein the third included angle is equal to or greater than about 0 degrees (°) and smaller than about 50 degrees (°).

14. The electronic device of claim 12, wherein a position of the protrusion part inserted into the second guide part moves to the fourth hole from the third hole while the fifth state is changed to the second state.

15. The electronic device of claim 3, wherein the protrusion part comprises a first protrusion part and a second protrusion part spaced apart from the first protrusion part in a thickness direction with the second hole interposed therebetween.

16. The electronic device of claim 15, wherein the second guide part defines a first sub-guide part and a second sub-guide part spaced apart from the first sub-guide part in the thickness direction with the third and fourth holes interposed therebetween.

17. The electronic device of claim 16, wherein the first sub-guide part is coupled to the first protrusion part, and the second sub-guide part is coupled to the second protrusion part.

18. The electronic device of claim 1, wherein the first accommodating part comprises a first surface extending in the first direction and having a first length in the first direction shorter than a second length of a second surface of the second accommodating part extending in the first direction.

19. The electronic device of claim 4, wherein the first accommodating part is disposed between the second accommodating part and the display module in the second state.

* * * * *